(12) United States Patent
Kobayashi

(10) Patent No.: US 7,745,559 B2
(45) Date of Patent: Jun. 29, 2010

(54) INTEGRATED CIRCUIT DEVICE

(75) Inventor: Shinichiro Kobayashi, Hino (JP)

(73) Assignee: Seiko Epson Corporation (JP)

( * ) Notice: Subject to any disclaimer, the term of this patent is extended or adjusted under 35 U.S.C. 154(b) by 286 days.

(21) Appl. No.: 11/846,877

(22) Filed: Aug. 29, 2007

(65) Prior Publication Data

US 2008/0054872 A1    Mar. 6, 2008

(30) Foreign Application Priority Data

Sep. 1, 2006    (JP) ............................. 2006-237372

(51) Int. Cl.
*H03K 17/62* (2006.01)
(52) U.S. Cl. .................. 527/403; 327/389; 323/271
(58) Field of Classification Search ................ 327/94, 327/158, 149, 156, 535, 538, 543, 111, 598, 327/355; 323/224, 239, 266, 282–284, 313–316, 323/271, 291; 307/131, 127, 128
See application file for complete search history.

(56) References Cited

U.S. PATENT DOCUMENTS 5,675,280 A * 10/1997 Nomura et al. ............. 327/538
5,731,731 A * 3/1998 Wilcox et al. .............. 327/403
5,880,624 A    3/1999 Koyanagi et al.
5,910,924 A    6/1999 Tanaka et al.
5,994,950 A   11/1999 Ochi
7,102,413 B2   9/2006 Kuroda
7,256,610 B1 * 8/2007 Balasubramanian et al. .. 326/38

FOREIGN PATENT DOCUMENTS

| JP | 60-143012 | 7/1985 |
| JP | 08-076864 | 3/1996 |
| JP | 10-064261 | 3/1998 |
| JP | 10-079653 | 3/1998 |
| JP | 10-150152 | 6/1998 |
| JP | 2004-186435 | 7/2004 |

* cited by examiner

*Primary Examiner*—Rajnikant B Patel
(74) *Attorney, Agent, or Firm*—Harness, Dickey & Pierce, P.L.C.

(57) ABSTRACT

An integrated circuit device includes: an internal circuit disposed on an inside area of the integrated circuit device; and at least one regulator circuit that generates a regulation voltage formed by stepping down a power supply voltage provided from outside, wherein an output terminal of the regulator circuit is connected to a first pad that is an external terminal of the integrated circuit device and a power supply line of the internal circuit, and the regulator circuit controls the state of the output terminal based on a plurality of control signals inputted respectively to a plurality of control terminals.

12 Claims, 25 Drawing Sheets

| HVDD | 5.00 | 4.50 | 5.50 |
|---|---|---|---|
| VREF | 3.30 | 3.01 | 3.60 |
| NB1 | 2.91 | 2.55 | 3.25 |
| NB2 | 1.46 | 1.27 | 1.66 |
| VDS | 0.39 | 0.46 | 0.35 |
| VGS | 1.84 | 1.74 | 1.94 |
| rn | – | Increase | Decrease |
| | | | |

| ENX | TENX | IENX | IENB | ITENX |
|---|---|---|---|---|
| L | H | L | H | H |
| H | H | H | L | H |
| - | L | H | L | L |

FIG. 23A

| ENX | TENX | RQ |
|---|---|---|
| L | H | LVDD |
| H | H | VSS |
| - | L | Hi-Z |

FIG. 23B

| ENX | DIST | TENX | IENX | IENB | ITENX |
|-----|------|------|------|------|-------|
| L | - | H | L | H | H |
| H | L | H | H | L | H |
| H | H | H | H | L | L |
| - | - | L | H | L | L |

FIG. 25A

| ENX | DIST | TENX | RQ |
|-----|------|------|-----|
| L | - | H | LVDD |
| H | L | H | VSS |
| H | H | H | Hi-Z |
| - | - | L | Hi-Z |

FIG. 25B

INTEGRATED CIRCUIT DEVICE

The entire disclosure of Japanese Patent Application No. 2006-237372, filed Sep. 1, 2006 is expressly incorporated by reference herein.

BACKGROUND

1. Technical Field

The invention relates to integrated circuit devices.

2. Related Art

An integrated circuit device, such as, a gate array and an embedded array, is manufactured by an ultra-high-density processing in order to increase the level of integration of its internal circuit. For this reason, a low voltage power is supplied to the internal circuit. Accordingly, it is necessary to supply from outside, for example, a high voltage power and a low voltage power for the internal circuit, which complicates the system structure.

In this case, a power supply circuit that generates a low voltage power for the internal circuit may be incorporated in the integrated circuit device, whereby the situation that complicates the system structure can be cancelled. However, the integrated circuit device cannot achieve lower power consumption if no device is implemented when such a power supply circuit is incorporated therein. An example of related art may be Japanese Laid-open Patent Application JP-A-60-143012.

SUMMARY

In accordance with an aspect of an embodiment of the present invention, there is provided an integrated circuit device that realizes lower power consumption by controlling output terminals of its regulator circuit.

An integrated circuit device in accordance with an embodiment of the invention includes: an internal circuit disposed in an inside area of the integrated circuit device, and at least one regulator circuit that generates a regulation voltage formed by stepping down a power supply voltage provided from outside, wherein an output terminal of the regulator circuit is connected to a first pad that is an external terminal of the integrated circuit device and a power supply line of the internal circuit, and the regulator circuit controls the state of the output terminal based on a plurality of control signals inputted respectively to a plurality of control terminals.

According to the present embodiment, the output terminal of the regulator circuit is connected to the first pad and the power supply line of the internal circuit. Then the state (signal state) of the output terminal is controlled based on a plurality of control signals. As a result, by controlling the state of the output terminal of the regulator circuit based on the plural control signals, for example, thereby stopping the power supply to the internal circuit, lower power consumption can be realized.

In accordance with an aspect of the present invention, the state of the output terminal of the regulator circuit may be set to a high impedance state when a first control signal among the plural control signals is activated.

Accordingly, the internal circuit may be operated by directly supplying a power of the regulation voltage from outside.

Also, in accordance with an aspect of the invention, the state of the output terminal of the regulator circuit may be set to a state based on a second control signal among the plural control signals, when the first control signal among the plural control signals is deactivated.

Accordingly, lower power consumption may be achieved, for example, by stopping the power supply to the internal circuit.

Also, in accordance with an aspect of the invention, the state of the output terminal of the regulator circuit may be set to a state based on a third control signal among the plural control signals, when the first and second control signal among the plural control signals are deactivated.

Accordingly, the power consumption may be reduced by, for example, stopping the power supply to the internal circuit.

Also, in accordance with an aspect of the invention, when the regulation voltage is directly supplied from outside of the integrated circuit device to the internal circuit through the first pad, the state of the output terminal of the regulator circuit may be set to a high impedance state.

Accordingly, the internal circuit may be operated by directly supplying a power of the regulation voltage from outside.

Also, in accordance with an aspect of the invention, when the integrated circuit device is set to a test mode, the state of the output terminal of the regulator circuit may be set to a high impedance state.

Accordingly, the internal circuit may be operated by a power of the regulation voltage supplied from outside without using the regulation voltage from the regulator circuit, whereby the internal circuit can be tested.

Also, in accordance with an aspect of the invention, a capacitor for stabilizing the regulation voltage of the regulator circuit may be connected to the first pad.

Accordingly, changes in the regulation voltage can be suppressed even when the regulator circuit has a slow response speed.

Also, in accordance with an aspect of the invention, the regulator circuit may control the state of the output terminal based on the plurality of control signals inputted respectively to the plurality of control terminals through a plurality of pads that are external terminals of the integrated circuit device.

Accordingly, even when the operation of the internal circuit is stopped, the state of the output terminal of the regulator circuit can be controlled based on plural control signals inputted from outside.

Also, in accordance with an aspect of the invention, the regulator circuit may control the state of the output terminal based on the plurality of control signals inputted respectively to the plurality of control terminals from a control circuit that operates with a power supply other than the power supply of the regulation voltage.

Accordingly, even when the internal circuit stops its operation, the state of the output terminal of the regulator circuit can be controlled based on a plurality of control signals provided from the control circuit that operates with an independent power supply.

Also, in accordance with an aspect of the invention, the regulator circuit may include a differential amplifier circuit having a first input terminal that receives as an input a reference voltage and a second input terminal that receives as an input the regulation voltage of the regulator circuit, and amplifies a voltage difference between the reference voltage and the regulation voltage, and an output circuit that is connected to an output terminal of the differential amplifier circuit and outputs the regulation voltage, wherein the output circuit may include a first conductivity type first output transistor provided between the output terminal of the regulator circuit and a first power supply and having a gate connected to the output terminal of the differential amplifier circuit, and a second conductivity type second output transistor provided between a second power supply and the output terminal of the regulator circuit and having a gate connected to the output terminal of the differential amplifier circuit.

According to the invention, the reference voltage and the regulation voltage are inputted in the first and second input terminals of the differential amplifier circuit of the regulator circuit, respectively. Further, the output circuit of the regulator circuit includes the first and second output transistors, and the gates of the first and second output transistors are commonly connected to the output terminal of the differential amplifier circuit. As a result, the regulator circuit would operate in a manner that the regulation voltage and the reference voltage become the same voltage. Also, the first output transistor may be functioned as a variable resistance element, such that an effective current supply to a load circuit (load) connected to the output terminal of the regulator circuit can be realized.

Also, in accordance with an aspect of the invention, the differential amplifier circuit may include a differential section having the first and second input terminals, a first output section connected to a first output terminal of the differential section, and a second output section connected to a second output terminal of the differential section.

It is noted that the same bias current may be circulated by, for example, a current mirror to the first and second output sections.

Also, in accordance with an aspect of the invention, the differential section may include a second conductivity type first transistor for generating bias current provided between the second power supply and a first node, a second conductivity type second transistor provided between the first node and a second node and having a gate that serves as the first input terminal, a second conductivity type third transistor provided between the first node and a third node and having a gate that serves as the second input terminal, a first conductivity type fourth transistor provided between the second node and the first power supply and having a gate connected to the second node, and a first conductivity type fifth transistor provided between the third node and the first power supply and having a gate and a drain connected to the third node, the first output section may include a second conductivity type sixth transistor provided between the second power supply and a fourth node and having a gate connected to the fourth node, and a first conductivity type seventh transistor provided between the fourth node and the first power supply and having a gate connected to the second node, the second output section may include a second conductivity type eighth transistor provided between the second power supply and a fifth node and having a gate connected to the fourth node, and a first conductivity type ninth transistor provided between the fifth node and the first power supply and having a gate connected to the third node.

By the structure described above, a regulator circuit with fewer poles and capable of stable operation can be realized.

Also, in accordance with an aspect of the invention, the regulator circuit may include an internal control circuit that generates a first internal control signal based on the plurality of control signals, and the differential section may include a first conductivity type tenth transistor that is provided between the second node and the first power supply and turns on and off based on the first internal control signal, and a first conductivity type eleventh transistor that is provided between the third node and the first power supply and turns on and off based on the first internal control signal.

With the structure described above, when the tenth and eleventh transistors are turned on, the second and third nodes can be set to a voltage of the first power supply. By this, the fourth and fifth transistors are turned off, whereby the current flowing to the differential section can be shut off and thus the power consumption can be lowered.

Also, in accordance with an aspect of the invention, the regulator circuit may include an internal control circuit that generates a second internal control signal based on the plurality of control signals, and the output circuit may include a first conductivity type first output state control transistor that is provided between the first output transistor and the first power supply and turns on and off based on the second internal control signal.

Accordingly, by turning the first output state control transistor off, the current flowing to the output circuit can be shut off, thereby lowering the power consumption.

Also, in accordance with an aspect of the invention, the regulator circuit may include an internal control circuit that generates a third internal control signal based on the plurality of control signals, and the output circuit may include a second conductivity type second output state control transistor that is provided between the second power supply and the output terminal of the differential amplifier circuit and turns on and off based on the third internal control signal.

Accordingly, by turning the second output state control transistor on, the output terminal of the differential amplifier circuit can be set to a voltage of the second power supply. By this, the second output transistor turns off, whereby the current flowing to the output circuit is shut off, thereby lowering the power consumption.

BRIEF DESCRIPTION OF THE DRAWINGS

FIGS. 23A and 23B are truth tables of the control circuit and the regulator circuit.

FIGS. 25A and 25B are truth tables of the control circuit and the regulator circuit.

DESCRIPTION OF EXEMPLARY EMBODIMENTS

Preferred embodiments of the invention are described in detail below. It is noted that the embodiments to be described below do not unduly limit the contents of the invention set forth in the claims. Also, not all of the compositions described in the embodiments may necessarily be indispensable as the solution provided by the invention.

1. Control Of Output State By Control Signals

Figure 1:
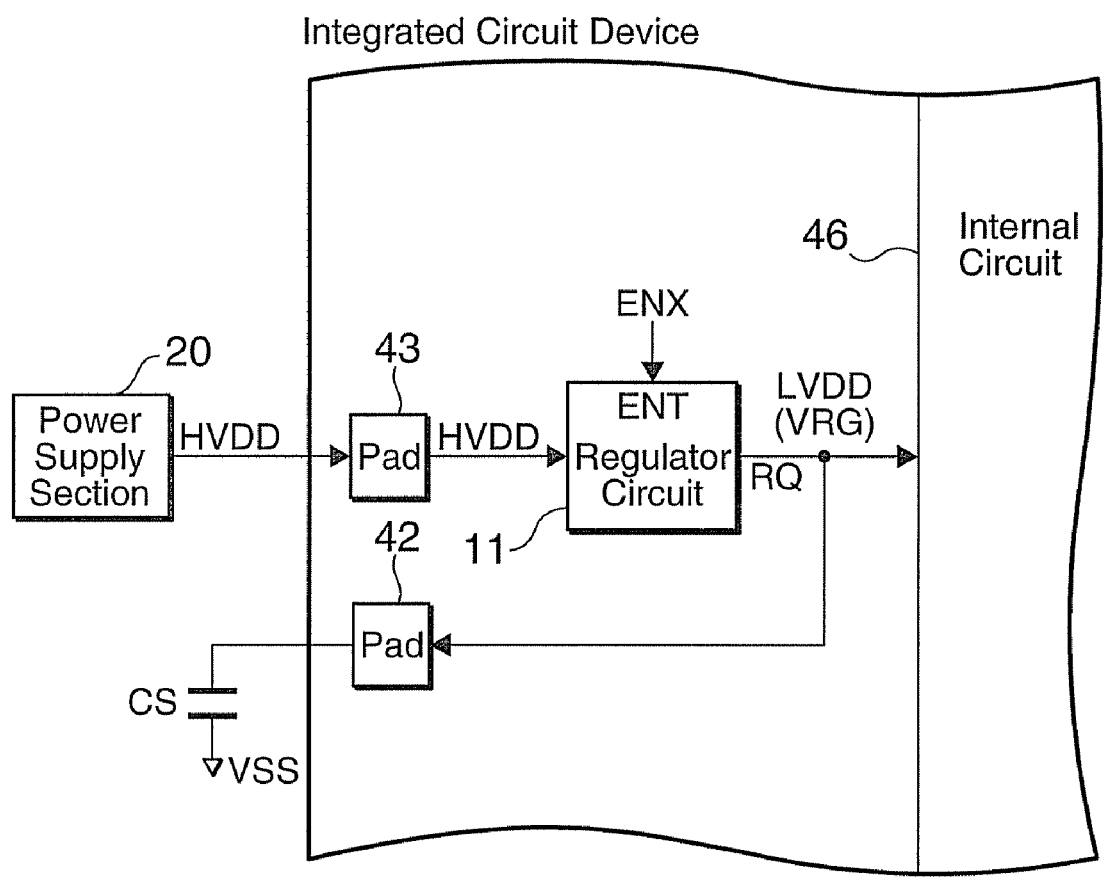
FIG. 1 is a schematic diagram of an example of an integrated circuit device in accordance with an embodiment of the invention.

FIG. 1 shows an example of an integrated circuit device in accordance with an embodiment of the invention. The integrated circuit device includes an internal circuit 46 (core circuit) and a regulator circuit 11. The internal circuit 46 may include CPU, RTC (real-time clock), display driver, memory, interface circuit, and a variety of logic circuits. Also, the regulator circuit 11 (step-down circuit) steps down a power supply voltage HVDD (high potential power supply) that is supplied through a pad 43 from an external power supply section 20, thereby generating a regulated voltage (regulation voltage), and supplies the generated regulation voltage to the internal circuit 46 as a feed power LVDD (low potential power supply). It is noted that FIG. 1 shows an example in which one regulator circuit 11 is provided, but two or more regulator circuits may be provided.

Also referring to FIG. 1, an output terminal RQ of the regulator circuit 11 is connected to a pad 42 that is an external terminal of the integrated circuit device, and also to a power supply line of the internal circuit 46. Also, the output terminal RQ of the regulator circuit 11 is connected to an external capacitor CS through the pad 42.

Figure 2A:
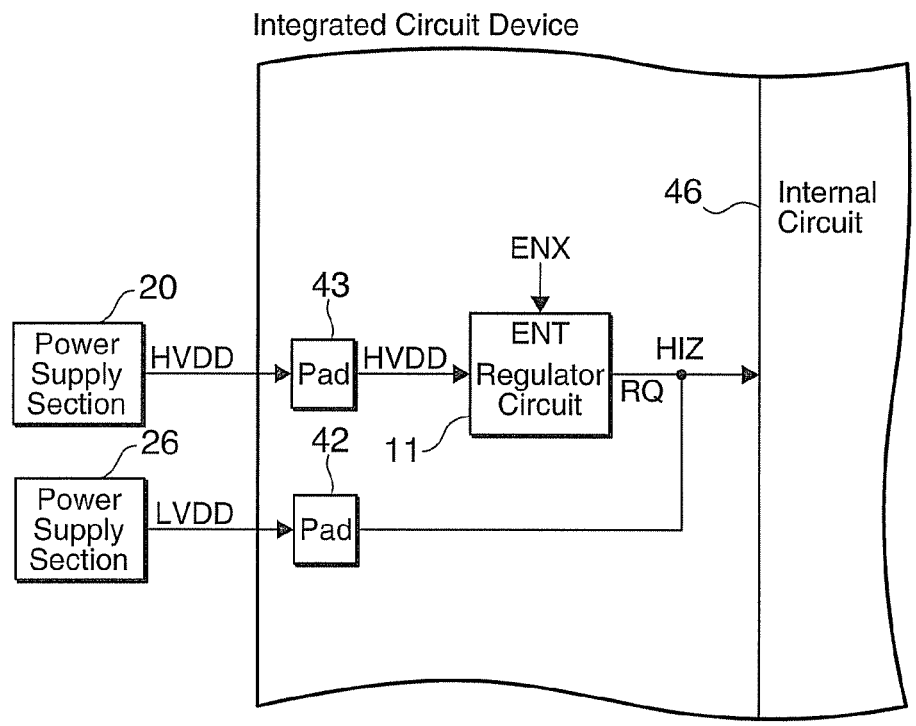
FIGS. 2A and 2B are schematic diagrams for describing a method to control the state of the output terminal.

Further, as shown in FIG. 1, the state of the output terminal RQ of the regulator circuit 11 is controlled based on a control signal ENX inputted through a control terminal. For example, when the control signal ENX become H level, the output terminal RQ becomes a high-impedance state. In this manner, by setting the input terminal RQ of the regulator circuit 11 to a high impedance state, the internal circuit 46 can be operated by a feed power LVDD directly supplied from the external power supply section 26 to the internal circuit 46, as shown in FIG. 2A.

For example, when the integrated circuit device in accordance with the present embodiment is applied to a custom product, there may be an occasion where the customer of the custom product wants the feed power LVDD not to be generated by the regulator circuit 11, but to be supplied from the external power supply source 20. Concretely, for example, let us consider a case in which the regulator circuit 11 has a circuit specification to step down the power supply voltage HVDD at 5V to a feed power voltage LVDD (VRG) at 3.3V. In some cases, the customer of the custom product wants the internal circuit 46 to be operated at 2.5V, instead of 3.3V, in order to reduce the power consumption. In this case, as shown in FIG. 2A, the control signal ENX may be set to H level, such that the output terminal RQ of the regulator circuit 11 is set to a high impedance state. As a result, the feed power LVDD from the power supply section 26 can be directly supplied through the pad 42 to the internal circuit 46. In this manner, a wide range of requests by the customers can be accommodated.

Figure 2B:
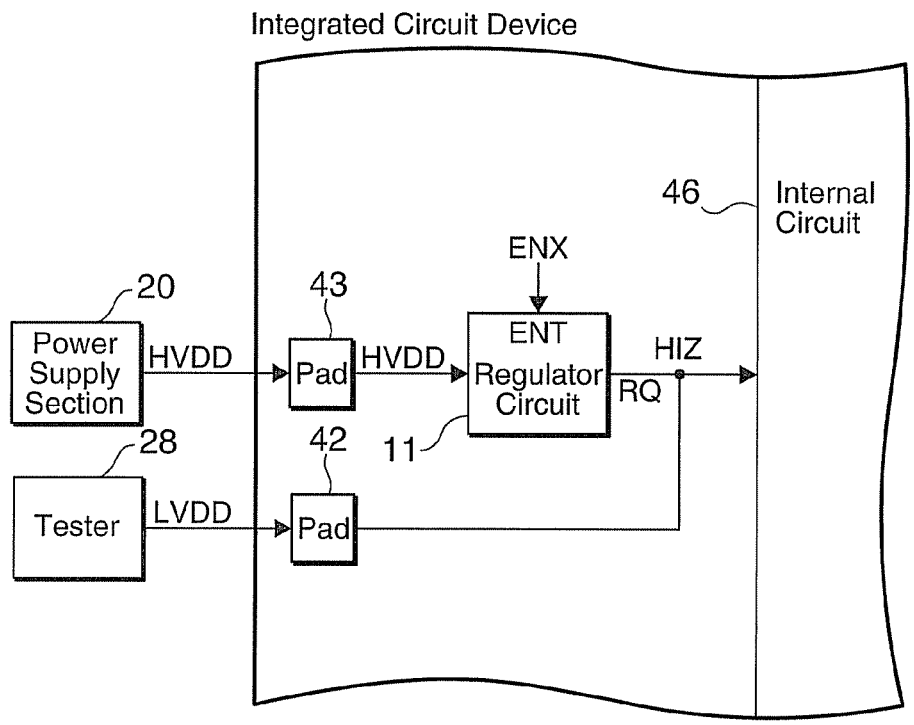

When the integrated circuit device is set to a test mode, and the internal circuit 46 is to be tested, it is not desirous to supply a voltage of the feed power LVDD generated by the regulator circuit 11 to the internal circuit 46. Accordingly, in such a test mode, as shown in FIG. 2B, the control signal ENX may be set to H level, whereby the output terminal RQ of the regulator circuit 11 is set to a high impedance state. Then a feed power LVDD from a tester (power supply section) may be directly supplied through the pad 42 to the internal circuit 46. Accordingly, the internal circuit 46 can be tested without being influenced by a voltage error in the feed power LVDD that is generated by the regulator circuit 11, such that the reliability of the test can be improved.

It is noted that, based on the control signal ENX, the state of the output terminal RQ of the regulator circuit 11 may be set to L level (a voltage of a first power supply in a broad sense). For example, when the control signal ENX is L level, the regulator circuit 11 is placed in a normal operation mode, wherein the feed power voltage LVDD is supplied to the internal circuit 46. On the other hand, when the control signal ENX becomes H level, the regulator circuit 11 outputs a voltage at L level.

In this manner, when the signal ENX becomes L level, and the output terminal RQ of the regulator circuit 11 is set to L level, the internal circuit 46 that is connected to the output terminal RQ is placed in a state where no power is supplied, whereby the internal circuit 46 can be set to a low power consumption mode (sleep mode). Also, when the signal ENX becomes H level, the current flowing to the regulator circuit 11 is shut off, such that the regulator circuit 11 is also set to a low power consumption mode (sleep mode). Accordingly, by only controlling the signal ENX, the regulator circuit 11 and the internal circuit 46 to which the power is supplied by the regulator circuit 11 can both be set to a low power consumption mode. Therefore, the low power consumption mode can be realized with a relatively simple control.

Next, a method for generating the control signal ENX is described. For example, in FIG. 3, the control signal ENX is inputted to a control terminal of the regulator circuit 11 through a pad 44 that is an external terminal of the integrated circuit device. Then the state of the output terminal RQ of the regulator circuit 11 is controlled based on the inputted control signal ENX.

More specifically, when the output state of the regulator circuit 11 is set to a high impedance state or L level, the feed power LVDD is not supplied to the internal circuit 46, such that the internal circuit 46 goes in an operation halt state. Accordingly, the control signal ENX cannot be generated by the internal circuit 46.

Figure 3:
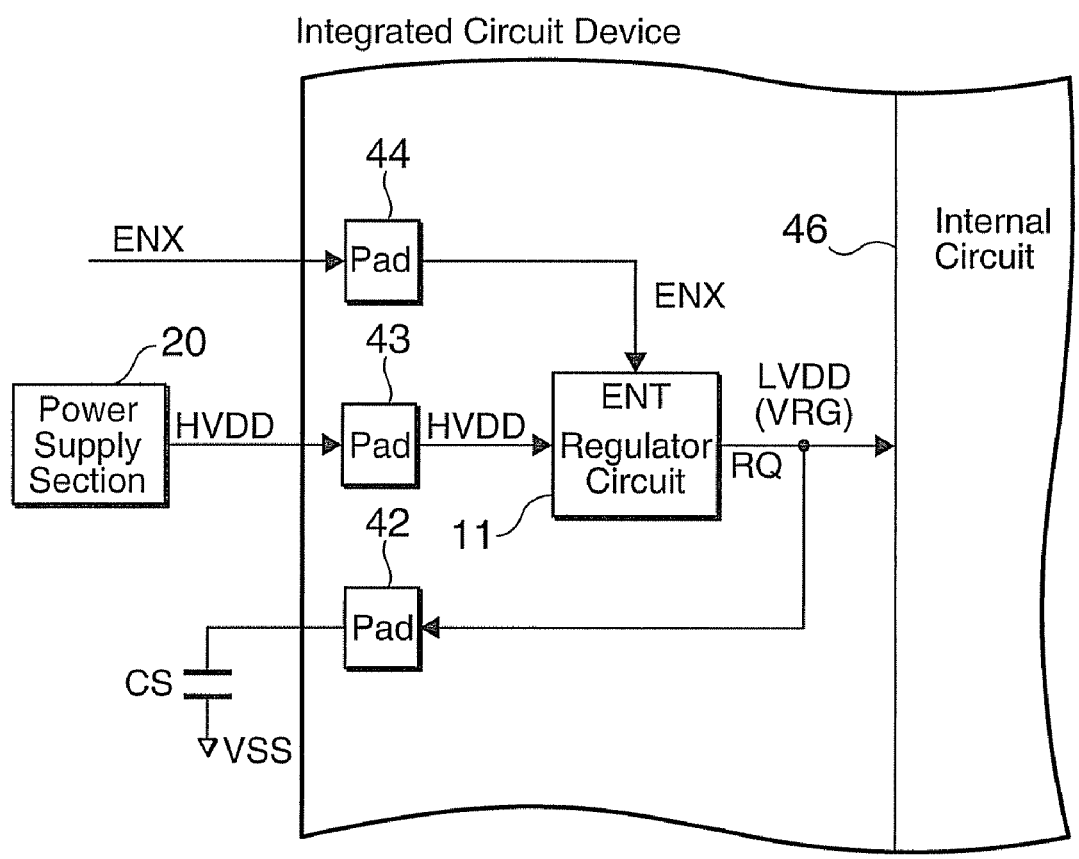
FIG. 3 is a schematic diagram for describing a method for generating a control signal.

In this respect, as shown in FIG. 3, the control signal ENX is inputted through the pad 44 from outside. Accordingly, even when the internal circuit 46 is in an operation halt state, the output state of the regulator circuit 11 can be controlled based on the control signal ENX inputted from outside. Accordingly, by only controlling the signal state of the control signal ENX, the supply of feed power LVDD from the regulator circuit 11 may be stopped thereby setting the internal circuit 46 to a low power consumption mode (sleep mode), or the internal circuit 46 may be reset from the low power consumption mode.

Figure 4:
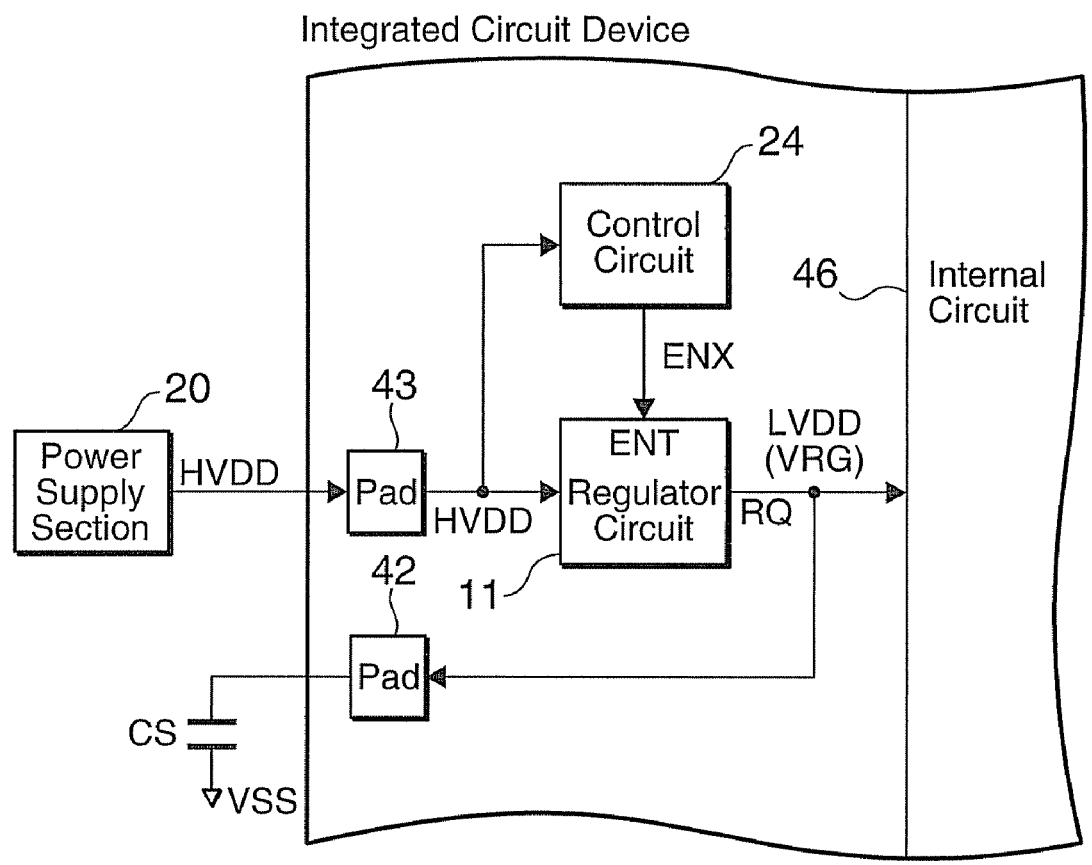
FIG. 4 is a schematic diagram for describing a method for generating a control signal.
Figure 5:
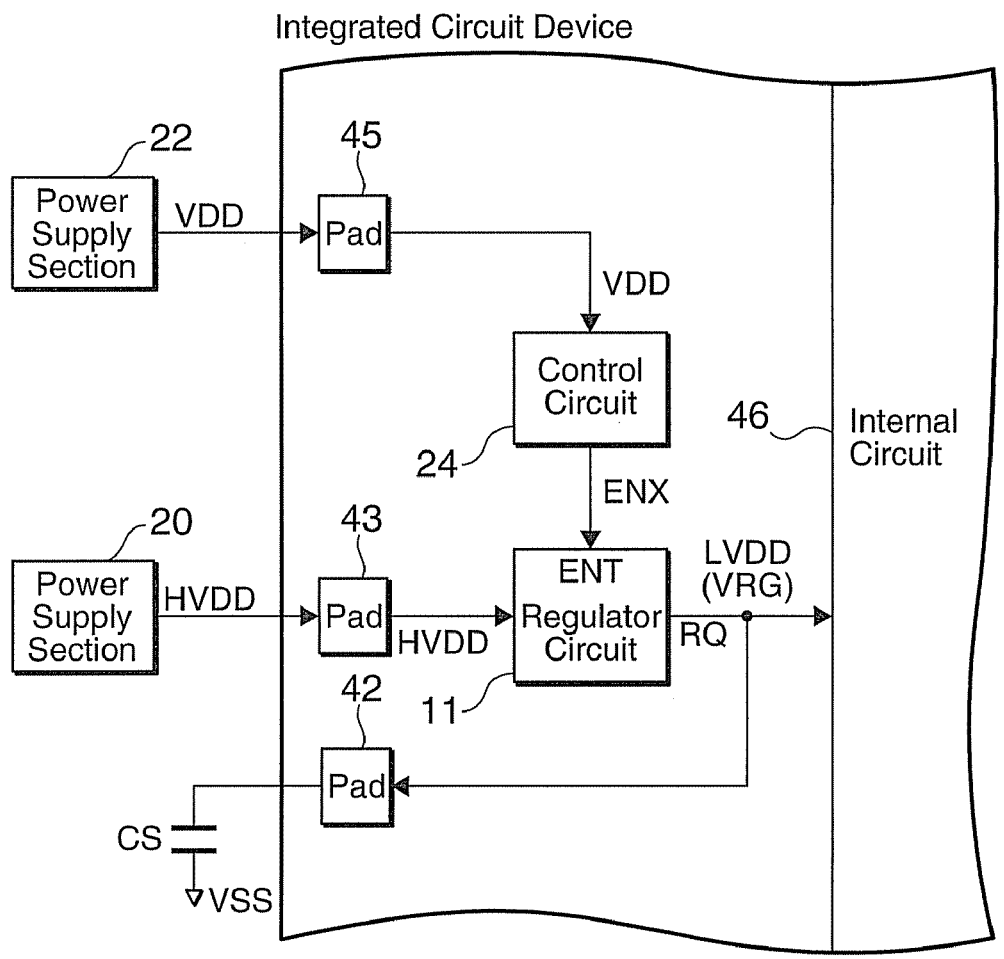
FIG. 5 is a schematic diagram for describing a method for generating a control signal.
Figure 6:
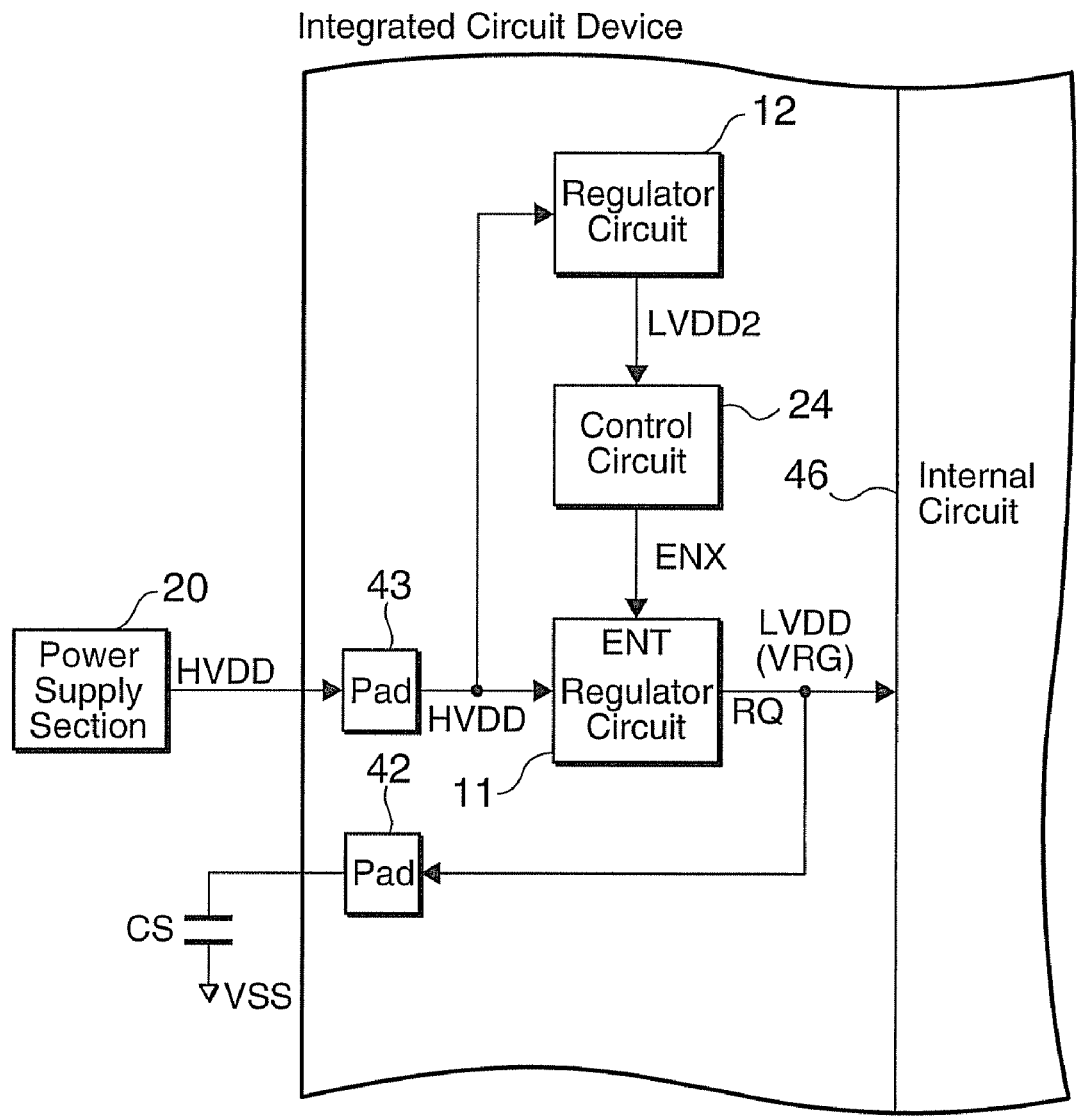
FIG. 6 is a schematic diagram for describing a method for generating a control signal.

Further, in examples shown in FIG. 4, FIG. 5 and FIG. 6, the control signal ENX is inputted to a control terminal of the regulator circuit 11 from a control circuit 24 that operates with a power supply other than the feed power LVDD of the regulated voltage. Then the state of the output terminal RQ of the regulator circuit 11 is controlled based on the control signal ENX.

For example, in the example shown in FIG. 4, the control circuit 24 is operated by the power supply HVDD. Accordingly, even when the control signal ENX becomes H level, the supply of the feed power LVDD by the regulator circuit 11 stops and the internal circuit 46 is set to a low power consumption mode, the control circuit 24 can be operated with the power supply HVDD. Accordingly, the control circuit 24 that operates with the power supply HVDD may set the control signal ENX to L level, whereby the supply of the feed power LVDD from the regulator circuit 11 resumes. By this, the internal circuit 46 can return from the low power consumption mode to the normal operation mode.

In the example shown in FIG. 5, the control circuit 24 is operated by a power supply VDD that is different from the power supply HVDD or the feed power LVDD. Accordingly, even when the supply of the feed power LVDD by the regulator circuit 11 stops, the control circuit 24 can be operated with the power supply VDD. Accordingly, the control circuit 24 that operates with the power supply VDD sets the control signal ENX to L level, whereby the supply of the feed power LVDD by the regulator circuit 11 resumes and the internal circuit 46 can return to the normal operation mode.

In the example shown in FIG. 6, two regulator circuits 11 and 12 are provided. The control circuit 24 operates with the supply of a feed power LVDD2 from the regulator circuit 12. Accordingly, even when the supply of the feed power LVDD by the regulator circuit 11 stops, the supply of the feed power LVDD2 by the regulator circuit 12 to the control circuit 24 does not stop, such that the control circuit 24 can be operated with the feed power LVDD2. Accordingly, the control circuit 24 that operates with the feed power LVDD2 sets the control signal ENX to L level, whereby the supply of the feed power LVDD by the regulator circuit 11 resumes and the internal circuit 46 can return to the normal operation mode.

Arrangement of Regulator Circuit in I/O Region

Figure 7:
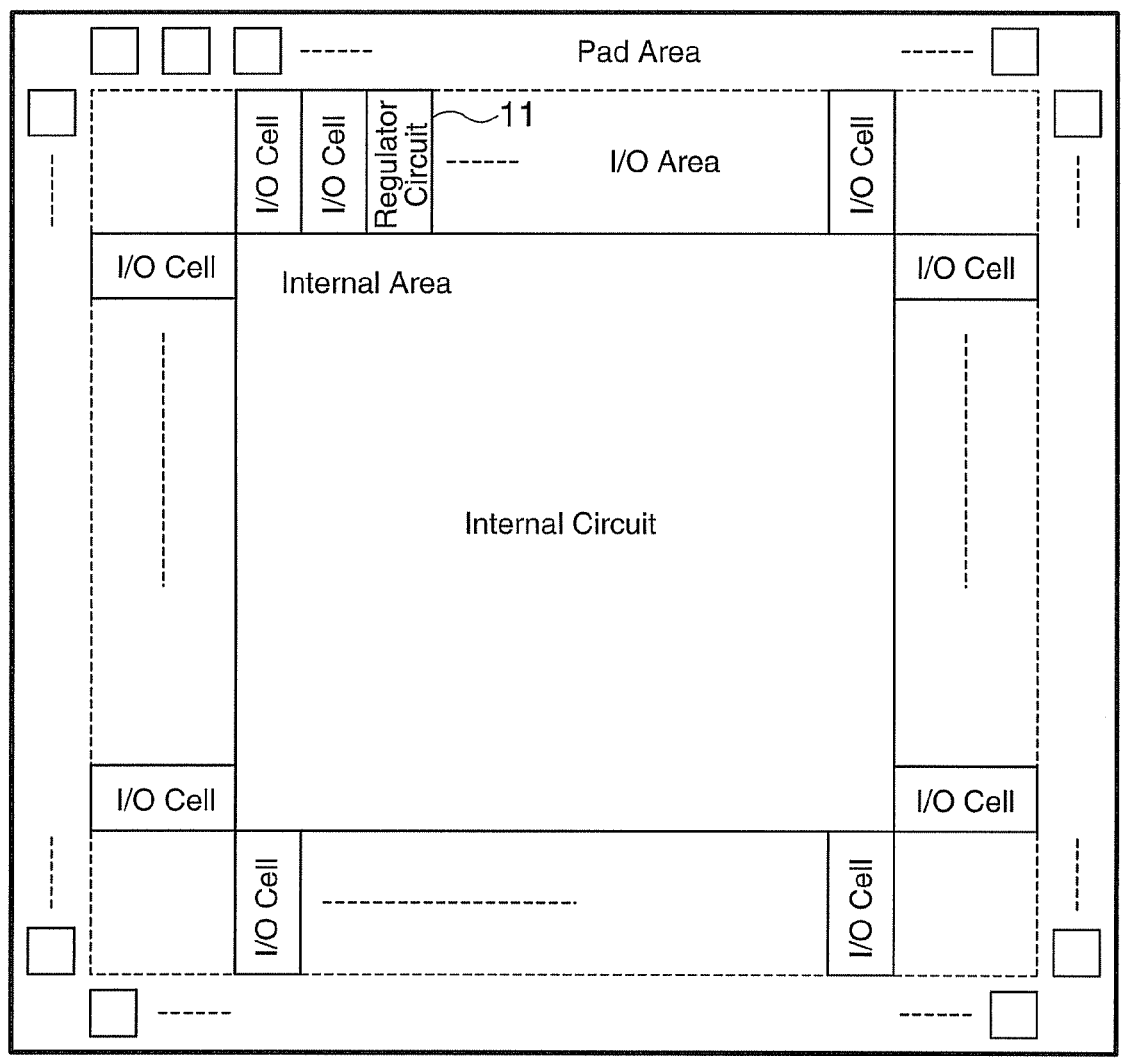
FIG. 7 shows a layout example of an integrated circuit device.

FIG. 7 shows a layout example of the integrated circuit device. The integrated circuit device in FIG. 7 may be applied to products, such as, for example, gate arrays and embedded arrays.

The integrated circuit device includes an internal region (core region), an I/O region and a pad region. The I/O region is formed outside of the internal region. Concretely, the I/O region is formed in a manner to surround the circumference (four sides) of the internal region. Also, the pad region is formed outside of the I/O region. Concretely, the pad region is formed in a manner to surround the circumference (four sides) of the I/O region. It is noted that pads to be disposed in the pad region may be disposed in the I/O region. In this case, the pad region becomes unnecessary.

An internal circuit (core circuit) of the integrated circuit device is arranged in the internal region. A plurality of I/O cells (for example, input buffers, output buffers, combined input/output buffers, or power supply cells) may be arranged in the I/O region. Concretely, for example, multiple I/O cells are arranged in a manner to surround the outer periphery (each of the sides) of the internal circuit. Further, pads to be connected to the respective I/O cells are arranged in the pad region. It is noted that the arrangement of the internal region, the I/O region and the pad region, and the arrangement of the I/O cells and the pads are not limited to those shown in FIG. 7, and a variety of modifications can be implemented.

In FIG. 7, a regulator circuit 11 (power supply circuit) is disposed (formed) in the I/O region of the integrated circuit device. Concretely, the regulator circuit 11 is formed with transistors (high voltage tolerance transistors) prepared for I/O cells, and disposed in the I/O region. In other words, the regulator circuit 11 is formed in a cell like other I/O cells, and disposed in the I/O region. The cell of the regulator circuit 11 in this case may have the same size as that of the I/O cell (at least one of the plural I/O cells).

For example, as a method of arranging the power supply circuit such as the regulator circuit 11 in the integrated circuit device in accordance with a comparison example, the power supply circuit may be formed in a macroblock, and the macroblock may be placed at a corner section of the integrated circuit device, or may be placed in a region including a portion of the I/O region.

However, in the arrangement of this comparison example, there is a limitation to the pin arrangement, and it becomes difficult to secure the degree of freedom in arrangement of pins in custom products requested by customers.

In contrast, according to the integrated circuit device shown in FIG. 7, the regulator circuit 11 can be placed at any arbitrary location in the I/O region. Accordingly, the degree of freedom in arrangement of pins in custom products requested by customers can be secured, and the force of product can be improved.

Figure 8:
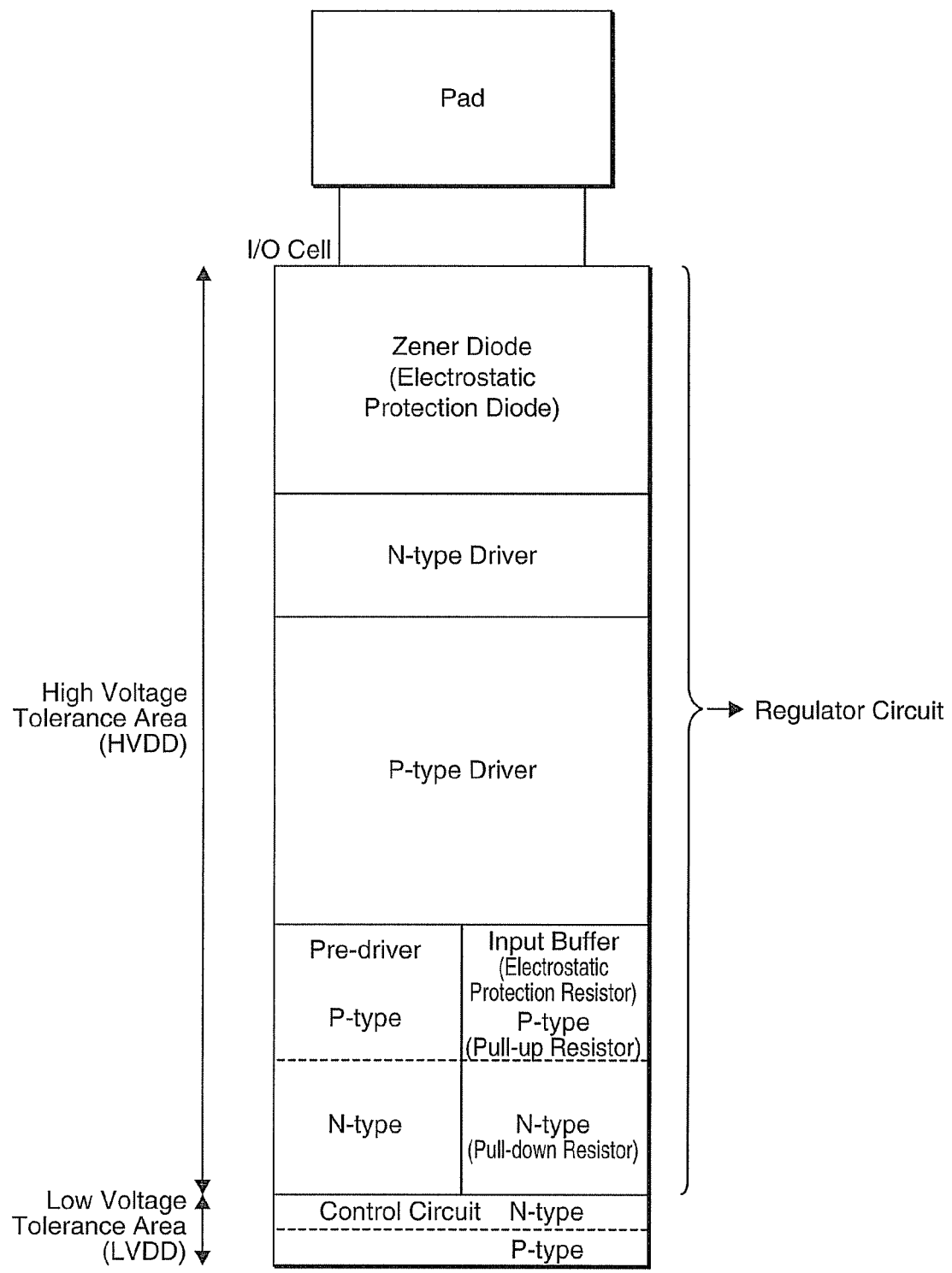
FIG. 8 shows a layout example of an I/O cell.

FIG. 8 shows a layout example of the I/O cell. A Zener diode that functions as an electrostatic protection diode is disposed in the I/O cell. An N-type driver and a P-type driver for driving signal lines to be connected to pads are also disposed in the I/O cell. The N-type driver and the P-type driver are formed from transistors having a substantially larger transistor size compared to that of other transistors in the I/O cell. Also, an input buffer and a pre-driver are disposed in the I/O cell. The input buffer may include, for example, a pull-up resistance element (pull-up transistor), a pull-down resistance element (pull-down transistor), or an electrostatic protection resistance element. Also, the pre-driver may include, for example, transistors for driving the N-type driver and P-type driver. A control logic is also disposed in the I/O cell. The control logic includes various logic circuits for controlling the pre-driver and the input buffer.

In FIG. 8, the Zener diode, N-type driver transistor, P-type driver transistor, P-type input buffer transistor, N-type input buffer transistor, P-type pre-driver transistor and N-type pre-driver transistor in the I/O cell are formed in a high voltage tolerance area (HVDD area). On the other hand, the N-type control logic transistor and P-type control transistor are formed in a low voltage tolerance area (LVDD area). By sequentially forming the high voltage tolerance area and the low voltage tolerance area, the border of the structures (for example, gate oxide films and the like) for forming the high voltage tolerance area and the low voltage tolerance area can be reduced as much as possible, and the border of the structures (well borders) for forming the N-type and P-type regions can also be reduced as much as possible, whereby the invention can be readily realized with a relatively simple structure.

Figure 9:
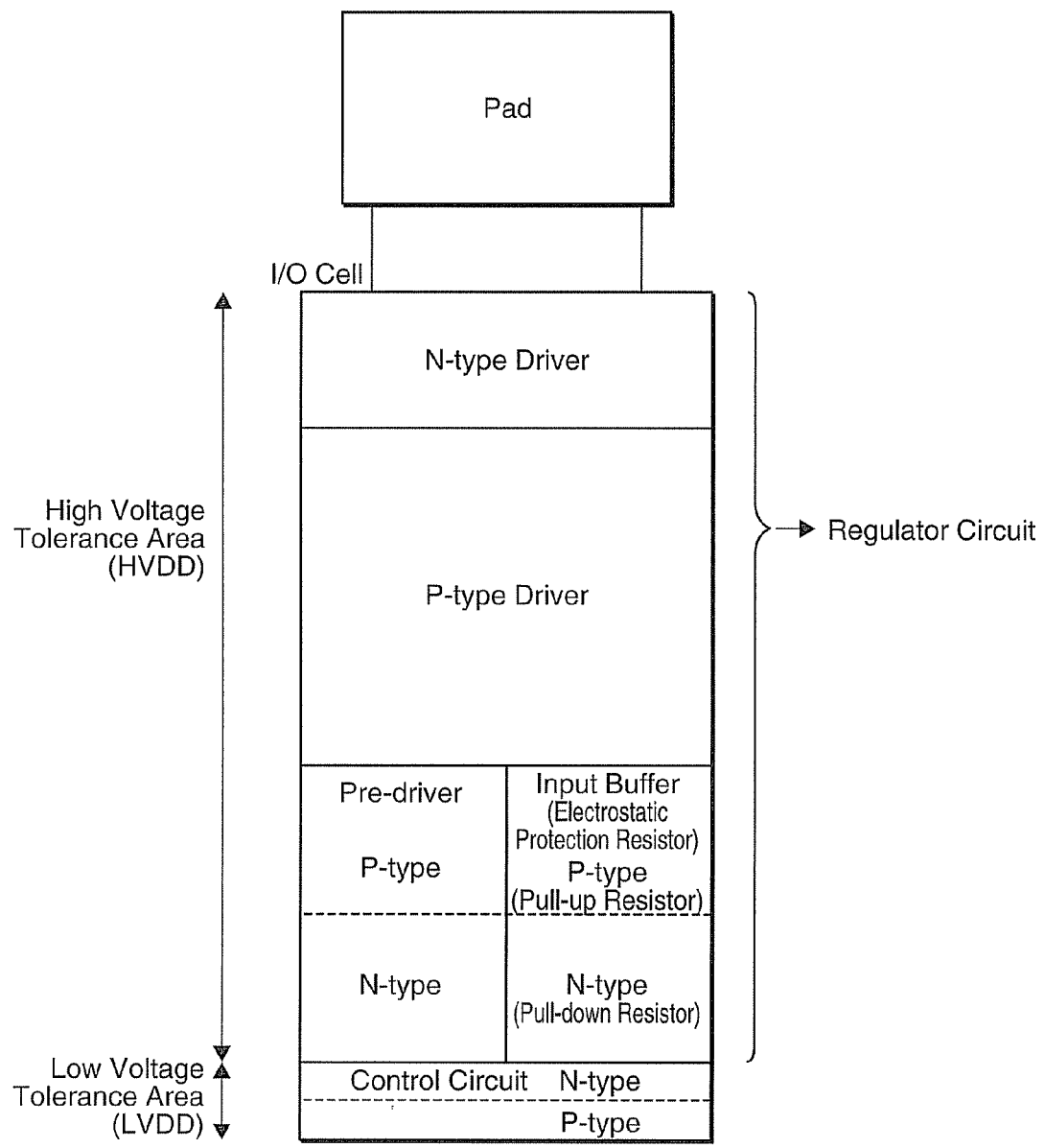
FIG. 9 shows a layout example of an I/O cell.

In accordance with the present embodiment, as shown in FIG. 8, the regulator circuit 11 is formed with elements disposed in the high voltage tolerance area (high voltage tolerance transistors and the like) for the I/O cell. For example, a P-type output transistor of the regulator circuit 11 to be described below (TQ2 in FIG. 14) may be formed with the p-type driver (high voltage tolerance transistor) in FIG. 8. A resistance element included in the regulator circuit (RP in FIG. 14) may be formed with the electrostatic protection resistance element in FIG. 8. Also, other transistors forming the regulator circuit 11 (TQ1, TA1-TA9 and the like) may be formed with transistors (high voltage tolerance transistors) disposed in the input buffer and pre-driver. It is noted that a modified embodiment is also possible without disposing a Zener diode, as shown in FIG. 9. Further, when there is no distinction between high voltage tolerance and low voltage tolerance in areas and transistors in the integrated circuit device, or when there is a distinction between high voltage tolerance and low voltage tolerance in areas and transistors in the integrated circuit device but a power supply voltage that does not destroy the low voltage tolerance area or transistors is supplied from outside, the regulator circuit in accordance with the present embodiment does not need to be disposed in the high voltage tolerance area.

In this manner, in accordance with the present embodiment, the regulator circuit 11 is formed with the elements such as transistors and resistances disposed in the I/O cell, such that the regulator circuit 11 can be disposed at any arbitrary position in the I/O region, as shown in FIG. 7. As a result, the degree of freedom in pin placement can be improved, the ESD voltage tolerance can be increased, and therefore the reliability can be improved.

It is noted that a plurality of regulator circuits may be formed in the I/O region, and the plurality of regulator circuits may supply regulation voltages in parallel to the internal circuit. Also, when the internal circuit includes a plurality of circuit blocks (CPU, RTC, memories and the like), at least one regulator circuit among the plurality of regulator circuits may supply a regulation voltage VRG (feed power voltage LVDD) to each of the plurality of circuit blocks. Also, when multiple well regions are formed in the internal region, at least one regulator circuit among the plurality of regulator circuits may supply a regulation voltage VRG (feed power voltage LVDD) to a circuit in each divided area of the multiple well regions divided in one or more areas.

3. STRUCTURE OF REGULATOR CIRCUIT

Figure 10:
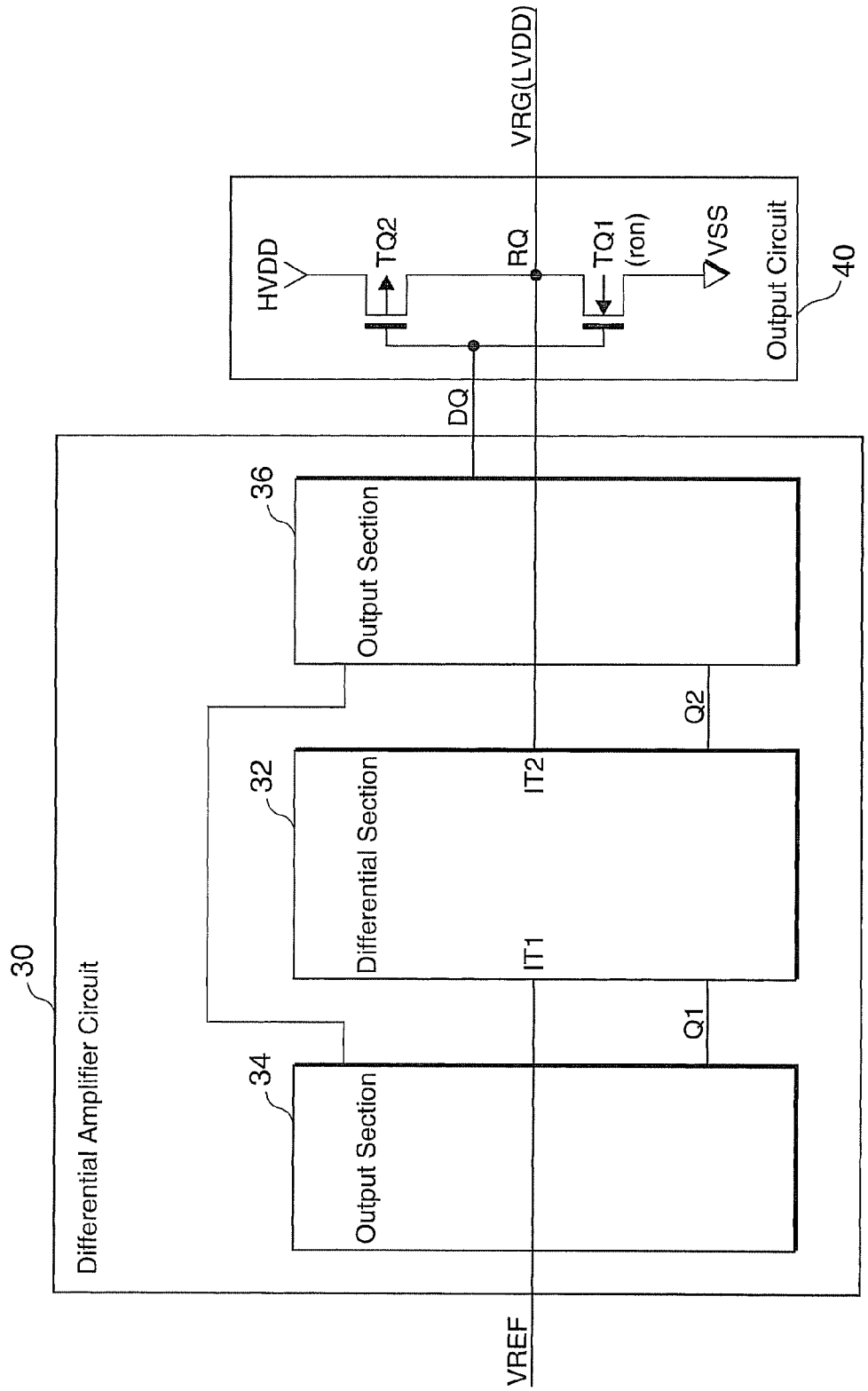
FIG. 10 shows an example of the structure of a regulator circuit.

FIG. 10 shows an example of the structure of a regulator circuit in accordance with an embodiment of the invention. The regulator circuit is a circuit that generates a regulation voltage VRG (feed power voltage LVDD) that is stepped down from a power supply voltage HVDD (a second power supply in a broad sense), and includes a differential amplifier circuit 30 and an output circuit 40. The differential amplifier circuit 30 has a first input terminal IT1 (one of a non-inversion input terminal and an inversion input terminal) to which a reference voltage VREF is inputted, and a second input terminal IT2 (the other of the non-inversion input terminal and the inversion input terminal) to which the regulation voltage VRG outputted from the regulator circuit is inputted. The differential amplifier circuit amplifies a voltage difference between the reference voltage VREF and the regulation voltage VRG, and outputs the amplified voltage to an output terminal DQ. The output circuit 40 (driver circuit) is connected to the output terminal DQ of the differential amplifier circuit 30, generates a regulation voltage VRG based on the amplified voltage from the differential amplifier circuit 30, and outputs the same.

The output circuit 40 includes an N-type (first conductivity type in a broad sense) first output transistor TQ1 (driving transistor) provided between an output terminal RQ of the regulator circuit and a power supply VSS (first power supply in a broad sense), and having a gate connected to the output terminal DQ of the differential amplifier circuit 30. The output circuit 40 also includes a P-type (second conductivity type in a broad sense) second output transistor TQ2 (driving transistor) provided between the power supply HVDD (second power supply) and the output terminal RQ, and having a gate connected to the output terminal DQ of the differential amplifier circuit 30.

More concretely, the differential amplifier circuit 30 includes the differential section 32 having the first and second input terminals IT1 and IT2, a first output section 34 connected to the first output terminal Q1 of the differential section 32, and a second output section 36 connected to the output terminal Q2 of the differential section 32. The output sections 34 and 36 are controlled such that the same bias current flows by, for example, a current mirror, and the output terminal DQ of the output section 36 is connected to the output circuit 40. It is noted that the structure of the differential amplifier circuit 30 is not limited to the structure shown in FIG. 10, and a variety of modifications can be implemented.

Figure 11:
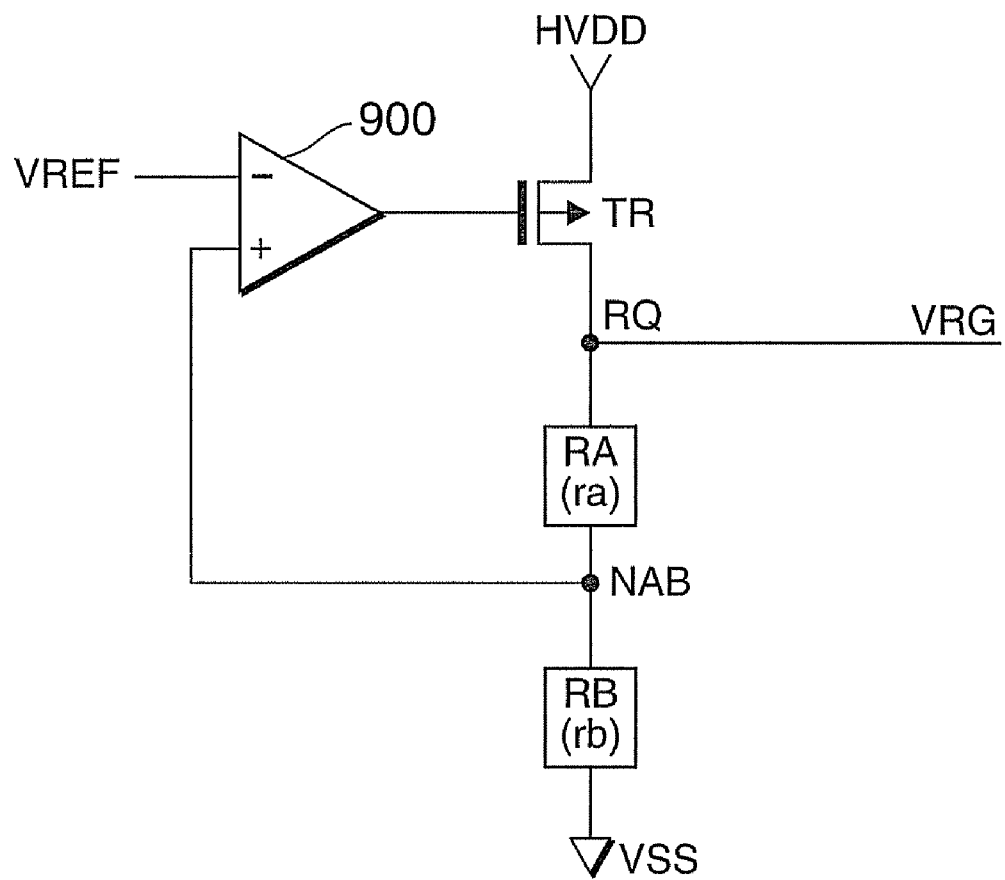
FIG. 11 shows an example of the structure of a regulator circuit that is a comparison example.

FIG. 11 is a schematic diagram of a regulator circuit in accordance with a comparison example. In the regulator circuit, a regulation voltage VRG on an output terminal RQ is voltage-divided by resistance elements RA and RB. A voltage obtained by voltage-dividing the regulation voltage VRG by the resistance elements RA and RB is inputted in a non-inversion input terminal of an operation amplifier 900 (differential amplifier circuit), and a reference voltage VREF is inputted in an inversion input terminal of the operation amplifier 900. The gate of an output transistor TR is controlled by the operation amplifier 900.

In the comparison example shown in FIG. 11, the reference voltage VREF is decided in consideration of the characteristics of a differential pair transistor (a transistor having a gate connected to the non-inversion and invention input terminals) and a response time obtained by the characteristics, and a voltage dividing ratio with resistance values ra and rb of the resistance elements RA and RB is decided based on the reference voltage VREF.

However, with the structure of the comparison example, regardless of the magnitude of the current consumed (operation current) by a load circuit (load) connected to the output terminal RQ of the regulator circuit, a constant current always flows to the resistance elements RA and RB, which wastes the power.

In this case, in the case of a group of products in which their substrate structure can be freely designed, such as, for example, full-custom products, the current that flows to the resistance elements RA and RB may possibly reduced by using elements having a high per-area resistance as the resistance elements RA and RB.

However, in the case of semi-custom products, such as, gate arrays in particular, device elements that can be provided on a substrate are limited, and there is a limitation to the resistance value of resistance elements that can be used as the resistance elements RA and RB. As a result, the current consumption at the resistance elements RA and RB becomes considerably large.

In contrast, in accordance with the present embodiment shown in FIG. 10, a voltage obtained by voltage-diving the regulation voltage VRG (feed power voltage LVDD) is not fed back, but the regulation voltage VRG itself is fed back to the differential amplifier circuit 30. In other words, the regulation voltage VRG is inputted in the second input terminal IT2 of the differential amplifier circuit 30. By this, the differential amplifier circuit 30 operates such that the reference voltage VREF and the regulation voltage VRG become the same voltage.

In this case, when the current consumption of a load circuit to be connected to the output terminal RQ of the regulator circuit becomes very small, the regulation voltage VRG would be raised to the power supply voltage HVDD. To prevent this phenomenon, in accordance with the present embodiment, the N-type output transistor TQ1 that functions as a variable resistance element is provided, instead of the resistance element RA and RB shown in FIG. 11, thereby preventing the regulation voltage VRG from becoming greater than a predetermined voltage. Further, the output terminal DQ of the differential amplifier circuit 30 is commonly connected to the gates of the N-type output transistor TQ1 and the P-type output transistor TQ2.

Accordingly, when the current consumption of the load circuit becomes smaller, and the regulation voltage VRG rises, the voltage at the output terminal DQ of the differential amplifier circuit 30 rises in order to prevent a voltage elevation in the regulation voltage VRG. By this, the on-resistance value of the P-type output transistor TQ2 increases, and the on-resistance value of the N-type output transistor TQ1 decreases (whereby the current flowing to TQ1 increases).

On the other hand, when the current consumption of the load circuit becomes larger, and the regulation voltage VRG lowers, the voltage at the output terminal DQ of the differential amplifier circuit 30 lowers in order to prevent a voltage reduction in the regulation voltage VRG. By this, the on-resistance value of the P-type output transistor TQ2 reduces, and the on-resistance value of the N-type output transistor TQ1 increases (whereby the current flowing to TQ1 reduces).

For example, in the case of the comparison example shown in FIG. 11, a constant current is always flowing to the resistance elements RA and RB, such that the current is wasted. In contrast, in accordance with the present embodiment, the N-type output transistor TQ1 having a gate connected to the output terminal DQ of the differential amplifier circuit 30 is provided, and the transistor TQ1 is functioned as a variable resistance element. Accordingly, when the current consumption of the load circuit becomes larger, the on-resistance value of the N-type output transistor Q1 increases, such that the current flowing to the TQ1 side reduces, and more current can be supplied to the load circuit side, whereby an effective current supply to the load circuit can be realized.

Also, in the case of the comparison example shown in FIG. 11, VRG equals to $\{(ra+rb)/rb\} \times VREF$, whereby differences in the resistance values ra and rb of the resistance elements RA and RB and their temperature characteristics adversely affect generation of the regulation voltage VRG.

In contrast, in accordance with the present embodiment, the regulation voltage VRG itself is fed back to the input terminal IT2 of the differential amplifier circuit 30. In other words, the reference voltage VREF and the regulation voltage VRG are directly compared to each other at the differential amplifier circuit 30. Accordingly, the present embodiment has an advantage in that differences in the resistance elements and their temperature characteristics would not adversely affect the regulation voltage VRG.

It is noted that the regulator circuit disposed in the integrated circuit device shown in FIGS. 1-7 may preferably be a circuit with the structure shown in FIG. 10, by may be a circuit of the comparison example shown in FIG. 11.

4. DETAILED STRUCTURE OF REGULATOR CIRCUIT

Figure 12:
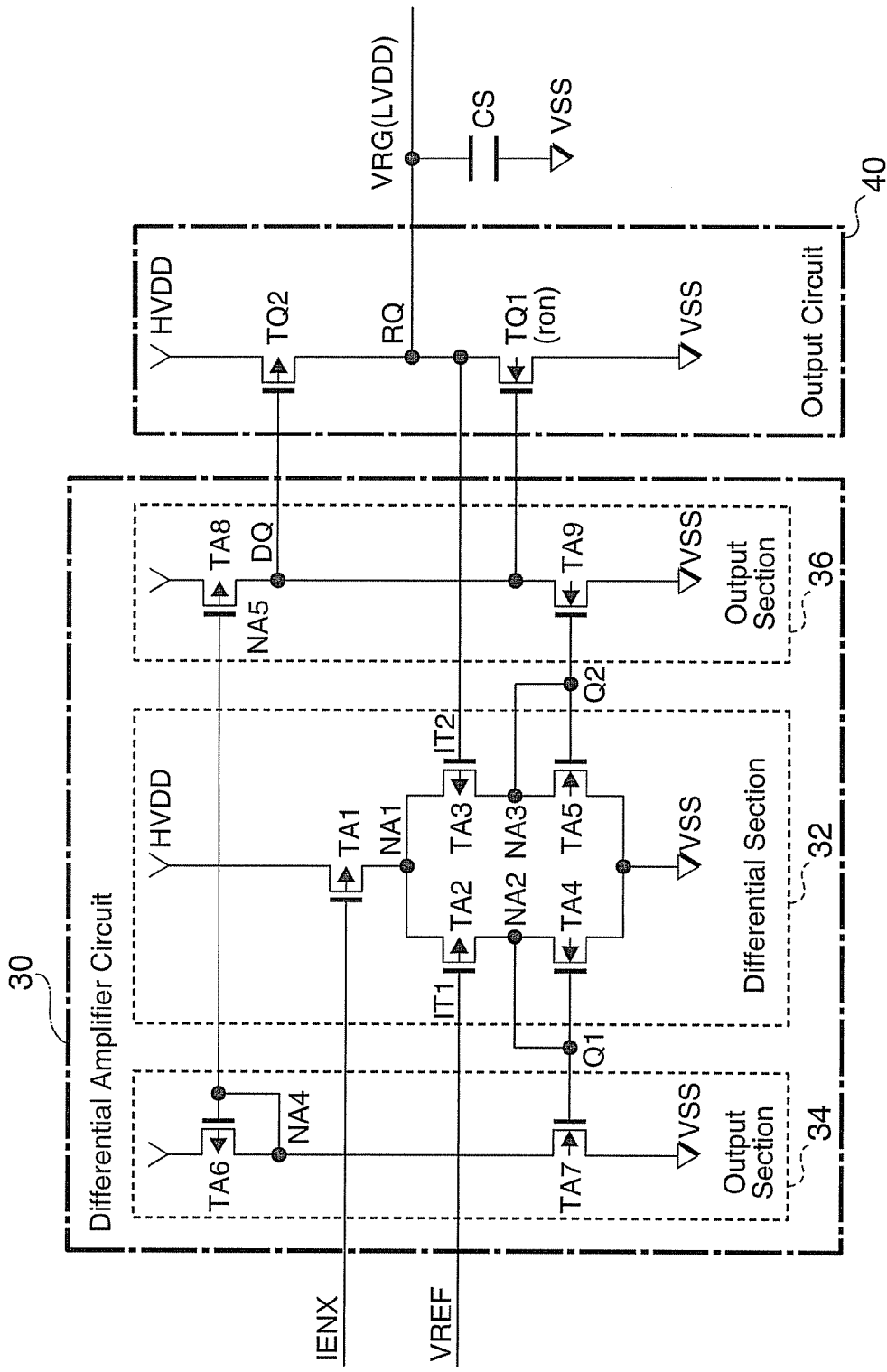
FIG. 12 shows an example of the structure in detail of a regulator circuit.

FIG. 12 shows in detail an example of the structure of the regulator circuit. It is noted that the regulator circuit is not limited to the structure shown in FIG. 12, but a various modifications, such as, changes in its connection relation, addition of other circuit elements, and the like, can be implemented.

In FIG. 12, the differential section 32 includes a P-type transistor TA1 for generating a bias current provided between the power supply HVDD and a node NA1. Also, the differential section 32 includes a P-type transistor TA2 provided between the node NA1 and a node NA2 and having a gate that serves as the input terminal IT1, and a P-type transistor TA3 provided between the node NA1 and a node NA3 and having a gate that serves as the input terminal IT2. The differential section 32 also includes an N-type transistor TA4 provided between the node NA2 and the power supply VSS (GND), and having a gate and a drain connected to the node NA2, and an N-type transistor TA5 provided between the node NA3 and the power supply VSS, and having a gate and a drain connected to the node NA3.

The output section 34 includes a P-type transistor TA6 provided between the power supply HVDD and the node NA4 and having a gate connected to the node NA4, and an N-type transistor TA7 provided between the node NA4 and the power supply VSS and having a gate connected to the node NA2. The output section 36 includes a P-type transistor TA8 provided between the power supply HVDD and a node NA5 and having a gate connected to the node NA4, and an N-type transistor TA9 provided between the node NA5 and the power supply VSS and having a gate connected to the node NA3.

According to the regulator circuit with the structure shown in FIG. 12, the number of poles can be reduced to, for example, one, such that the circuit can be prevented from oscillating by external noise or the like, and therefore a stable operation can be achieved.

Figure 13:
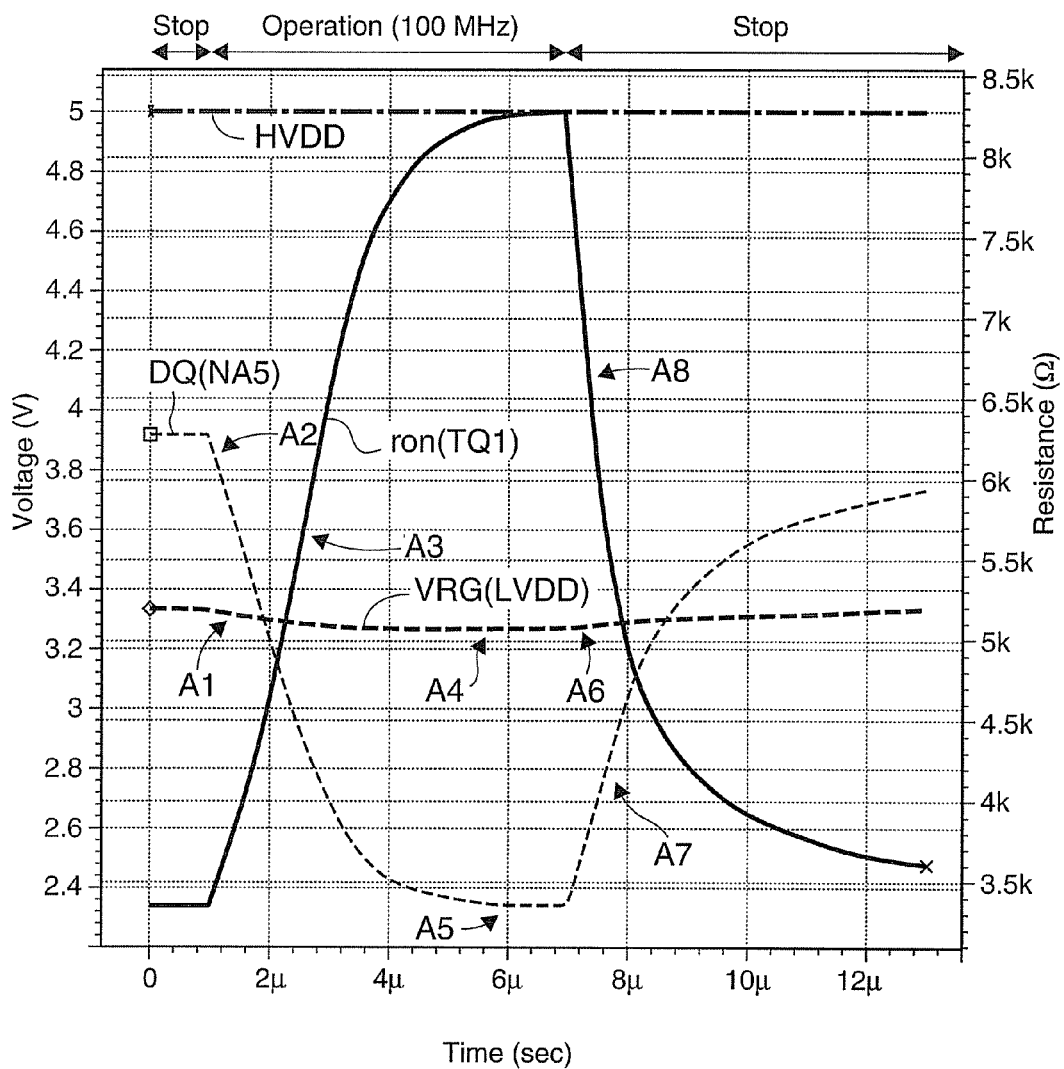
FIG. 13 shows a result of simulation of signals at respective nodes of the regulator circuit.

FIG. 13 shows a result of simulation of the regulation circuit of FIG. 12. In FIG. 13, the power supply voltage HVDD is 5V, the load circuit (for example, a circuit with 4000 gates) connected to the output terminal RQ of the regulator circuit is stopped (inactive) during the period between 0 μs and 1 μs and the period between 7 μs and 13 μs, and the load circuit operates at 100 MHz during the period between 1 μs and 7 μs.

As the load circuit stops during the period between 0 μs and 1 μs, the output terminal DQ of the differential amplifier circuit 30 is at a voltage near the power supply voltage HVDD and is stable. Accordingly, the voltage at the gate of the N-type output transistor TQ1 becomes higher, and therefore the on-resistance value ron of the transistor TQ1 has a small value.

At the time=1 μs, the load circuit starts its operation, a rapid power consumption by the load circuit starts, but the regulator circuit cannot follow this change. Then, a voltage stabilizing capacitor CA that is connected to the output terminal RQ of the regulator circuit starts discharging, thereby attempting to maintain the voltage level of the regulation voltage VRG (feed power voltage LVDD).

As the capacitor CS continues discharging the charge, and the regulation voltage VRG lowers as indicated by A1 in FIG. 13, the voltage at the output terminal DQ of the differential amplifier circuit 30 starts lowering as indicated at A2 after a little delay since the rapid power consumption started. By this, the on-resistance value of the P-type output transistor TQ2 reduces, and the on-resistance value ron of the N-type output transistor TQ1 increases, as indicated by A3.

Then, when the regulation voltage VRG becomes a specified voltage as indicated by A4 in FIG. 13 due to the impedance value of the load circuit and the on-resistance value of the P-type output transistor TQ2, the change in the voltage at the output terminal DQ is completed as indicated by A5.

When the time=7 μs, and the load circuit goes into a stop state, the impedance value at the load circuit rapidly increases, and the regulation voltage VRG increases as indicated by A6. At this time, as indicated by A7, the voltage at the output terminal DQ of the differential amplifier circuit 30 starts rising. By this, the on-resistance value of the P-type output transistor TQ2 increases, and the on-resistance value ron of the N-type output transistor TQ1 decreases, as indicated by A8. Accordingly, an elevation of the voltage at the output terminal RQ of the regulator circuit is suppressed.

In this manner, in the regulator circuit in accordance with the present embodiment, when the load circuit starts operation, the on-resistance value ron of the N-type output transistor TQ1 elevates as indicated by A3 in FIG. 13. By this, the current flowing to the side of the N-type output transistor TQ1 reduces, while the current flowing to the side of the load circuit from the power supply HVDD increases. Accordingly, more current can be supplied to the load circuit side.

When the load circuit stops its operation, the voltage at the output terminal DQ of the differential amplifier circuit 30 elevates, as indicated by A7. By this, the on-resistance value of the P-type transistor TQ2 elevates, and the current consumption at the output circuit 40 is suppressed.

In accordance with the present embodiment, to prevent wasteful power consumption at the output circuit 40, the transistor size (W/L) of the P-type output transistor TQ2 is made larger, and the transistor size of the N-type output transistor TQ1 is made smaller. More concretely, the transistor size of the transistor TQ1 is 1/10 or smaller, and more preferably 1/50 or smaller the transistor size of the transistor TQ2. For example, when the transistor size of the transistor TQ2 is at W/L=1500, the transistor size of the transistor TQ1 may be at, for example, W/L=about 17.

5. MODIFIED EXAMPLE OF REGULATOR CIRCUIT (1) First Modified Example

Figure 14:
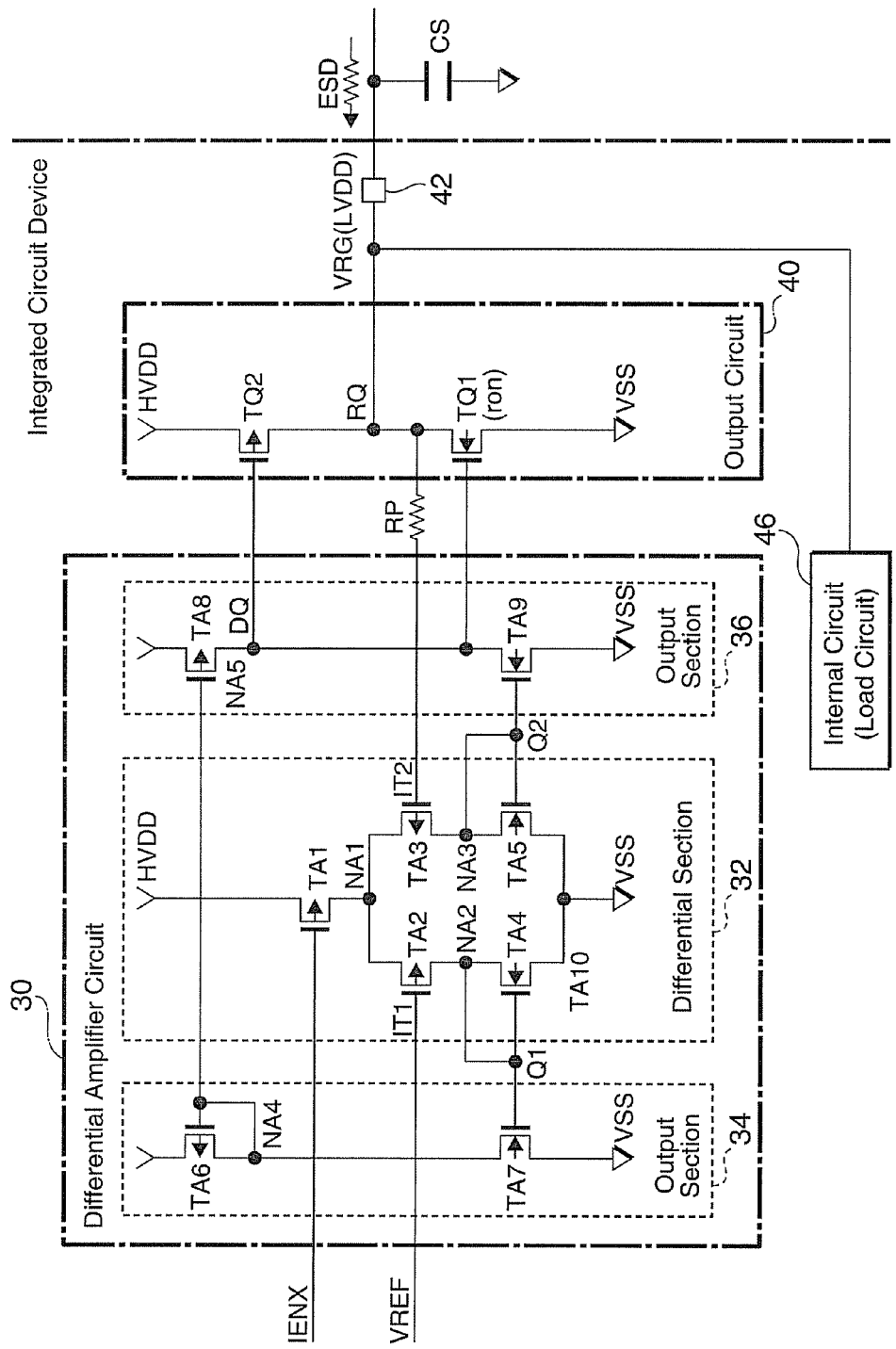
FIG. 14 is a first modified example of the regulator circuit.

FIG. 14 shows a first modified example of the regulator circuit. The regulator circuit shown in FIG. 14 includes a resistance element RP for electrostatic protection provided between the input terminal IT2 and the output terminal RQ2. The resistance element RP can be realized by using, for example, well resistance.

Also, the integrated circuit device shown in FIG. 14 includes a regulator circuit in accordance with the present embodiment, and an internal circuit 46 (core circuit) that is operated with a regulation voltage VRG being supplied from the regulator circuit as a power supply voltage (feed power voltage LVDD). The internal circuit 46 may include, for example, CPU, RTC (real-time clock), display driver, memory, interface circuit, or a variety of logic circuits. Also, the integrated circuit device includes a pad 42 (external terminal) to be connected to the output terminal of the regulator circuit. The pad 42 is connected to a capacitor CS for stabilizing the regulation voltage generated by the regulator circuit. Also, the pad 42 is connected to a power supply line (feed power source VLDD) of the inner circuit 46. It is noted that the capacitor CS may be built in the integrated circuit device in accordance with a modified example of the embodiment.

The regulator circuit with the structure shown in FIG. 12 has advantages in that the number of poles is small, it is difficult to oscillate, and its operation is stable. On the other hand, there may be a disadvantage in that its response speed is relatively low as indicated by A1, A4 and A6 in FIG. 13. In other words, the regulator circuit cannot quickly respond to a rapid current consumption at the internal circuit 46 that is a load circuit, and its response is slow.

Figure 15:
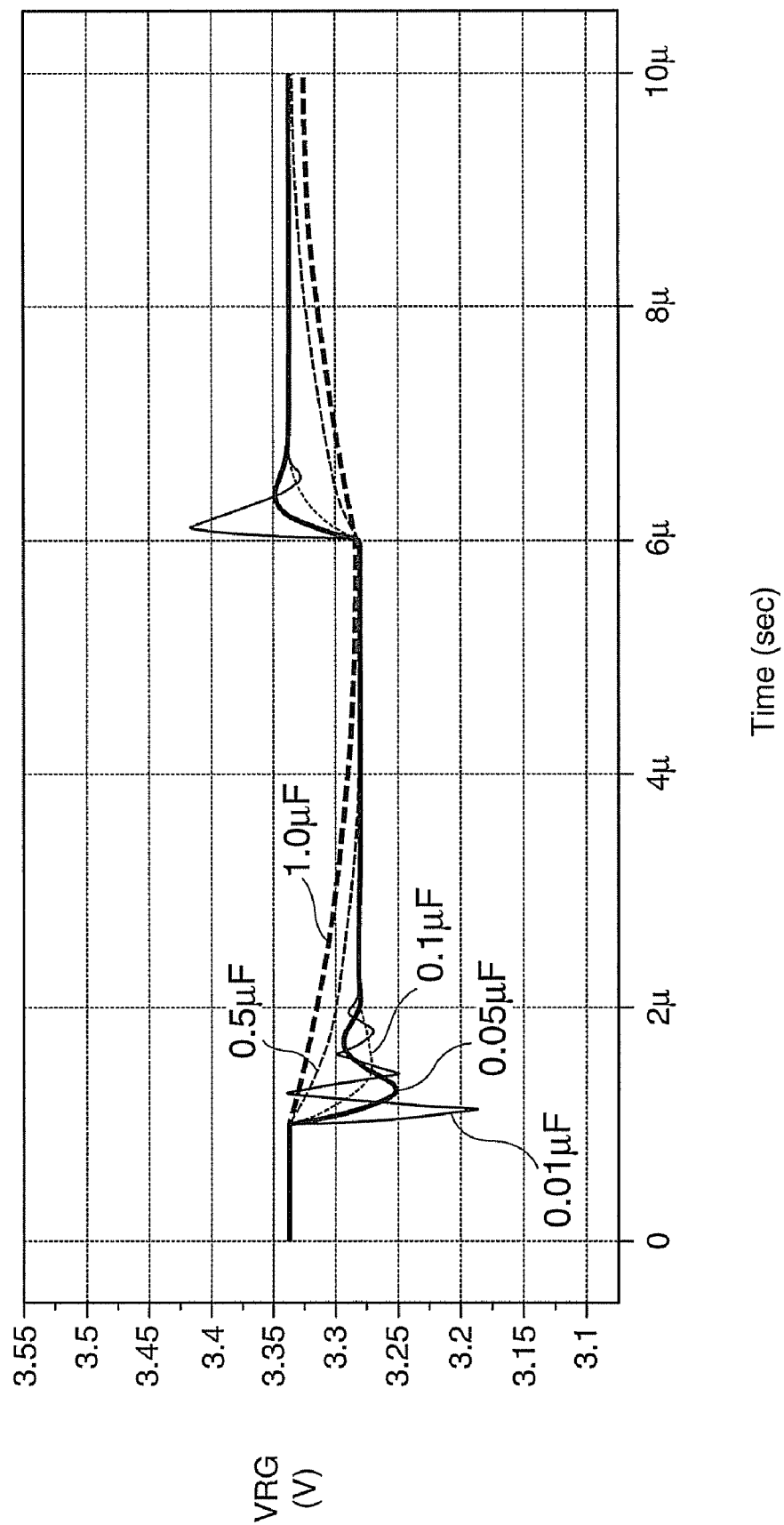
FIG. 15 shows a result of simulation of transient characteristics of regulation voltages when capacitors with a variety of capacitance values are used.

Accordingly, in the example shown in FIG. 14, the pad 42 that is an external terminal is provided, such that the capacitor CS for stabilizing the regulation voltage VRG can be connected to the pad 42. By connecting the capacitor CS, the rapid current consumption by the internal circuit 46 can be accommodated by a charge discharged from the capacitor CS. For example, FIG. 15 shows the results of simulation of transient characteristic of the regulation voltage VRG when the capacitor CS with a variety of capacitance values is used. As shown in FIG. 15, the greater the capacitance value of the capacitor CS, the more stable the transient characteristic of the regulation voltage VRG becomes.

When the pad 42 as shown in FIG. 14 is provided, there may be an incident in which ESD from outside is applied to the output terminal RQ of the regulator circuit through the pad 42. In this case, the transistor size of the P-type output transistor TQ2 is large and its drain size is large, such that its ESD tolerance is high. Also, the ESD tolerance of the N-type output transistor TQ1 having a smaller transistor size can be improved by providing a diode for electrostatic protection between the output terminal RQ and the power supply VSS (GND).

However, the present embodiment uses the structure in which the regulation voltage VRG is directly fed back to the input terminal IT2 of the differential amplifier circuit 30. Accordingly, there is a possibility that the gate of the transistor TA3, which serves as the input terminal IT2, may be destroyed by static electricity.

In this respect, the example shown in FIG. 14 is provided with the resistance element RP for electrostatic protection between the output terminal RQ and the input terminal IT2 (the gate of the transistor TA3), such that such an electrostatic destruction can be effectively prevented.

(2) Second Modified Example

Figure 16:
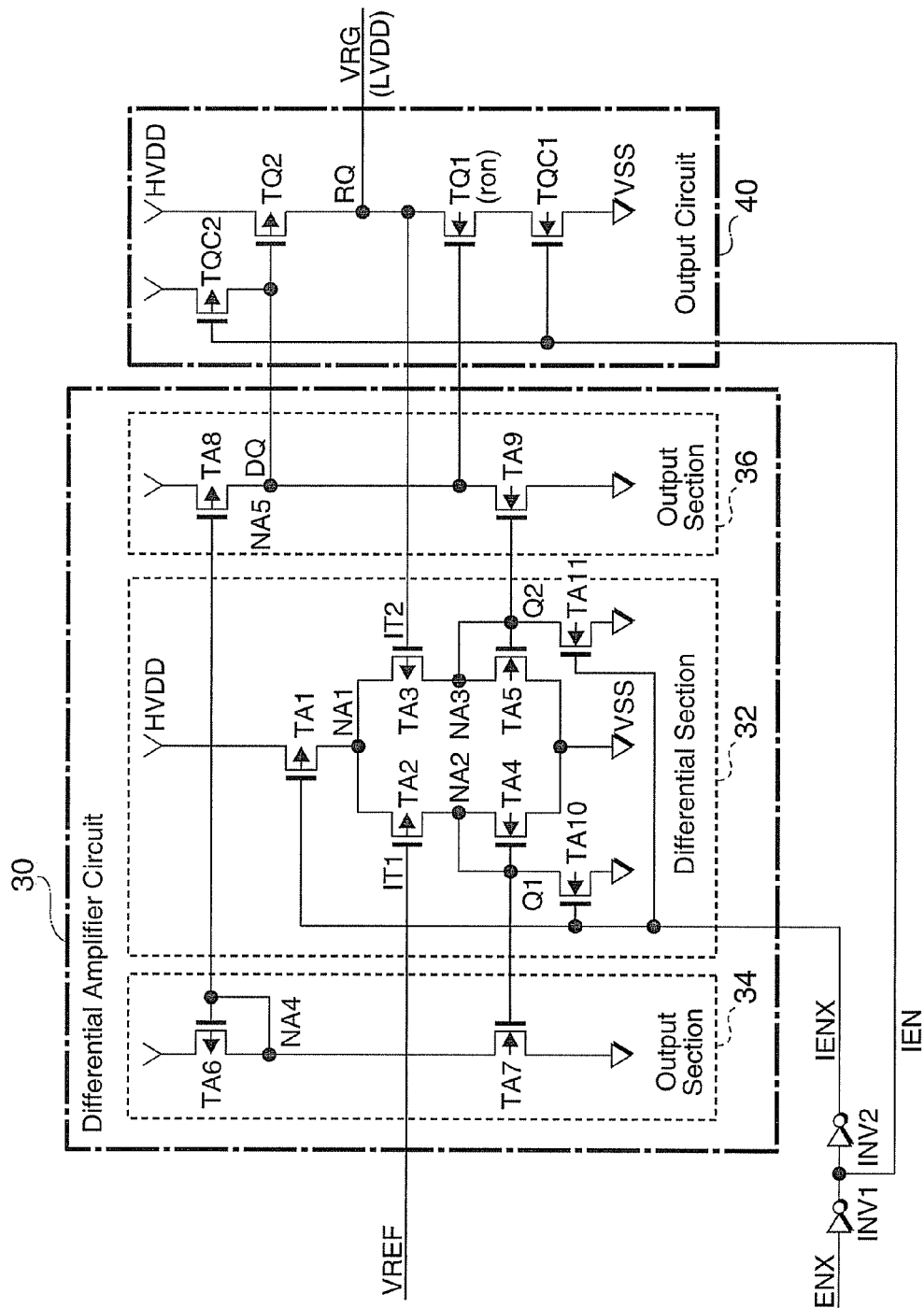
FIG. 16 is a second modified example of the regulator circuit.

FIG. 16 shows a second modified example of the regulator circuit. The differential section 32 in FIG. 16 includes an N-type transistor TA10 that is provided between the node NA2 and the power supply VSS, and turns on and off based on a control signal ENX (IENX). The differential section 32 also includes an N-type transistor TA11 that is provided between the node NA3 and the power supply VSS, and turns on and off based on the control signal ENX (IENX). It is noted that "X" indicates a negative logic.

Also, the output circuit 40 includes an N-type transistor TQC1 for output state control that is provided between the output transistor TQ1 and the power supply VSS, and turns on and off based on the control signal ENX (IEN). The output circuit 40 also includes a P-type transistor TQC2 for output state control that is provided between the power supply HVDD and the output terminal DQ of the differential amplifier circuit 30, and turns on and off based on the control signal ENX (IEN).

For example, when the control signal ENX becomes L level (active), and the regulator circuit is set to an enable state, the signal IENX becomes L (low) level, and the signal IEN becomes H (high) level, whereby the transistors TA10, TA11 and TQC2 become an off-state, and the transistor TQC1 becomes an on-state. Accordingly, the circuit shown in FIG. 16 has a circuit structure equal to that of the circuit shown in FIG. 12.

On the other hand, when the signal ENX becomes H level (non-active), and the regulator circuit is set to a disenable state, the transistors TA10, TA11 and TQC2 become an on-state, and the transistor TQC1 becomes an off-state. When the transistors TA10 and TA11 become an on-state, the nodes NA2 and NA3 (Q1, Q2) become L level, such that the transistors TA4, TA5, TA7 and TA9 become an off-state. Accordingly, the current flowing through the differential section 32 and the output sections 34 and 36 can be shut off, such that the power consumption can be lowered.

Also, when the transistor TQC2 turns off, the node NA5 becomes H level, and the transistor TQ2 becomes an off state.

Accordingly, the current flowing through the transistor TQ2 from the power supply HVDD can be shut off. Also, when the transistor TQC1 turns off, the current flowing from the output terminal RQ to the power supply VSS can be shut off. Accordingly, the current flowing through the output circuit 40 can be shut off, whereby the power consumption can be lowered.

Also, by turning the output state control transistor TQC1 to an off state, the output terminal RQ of the regulator circuit can be set to a high impedance state.

(3) Third Modified Example

Figure 17:
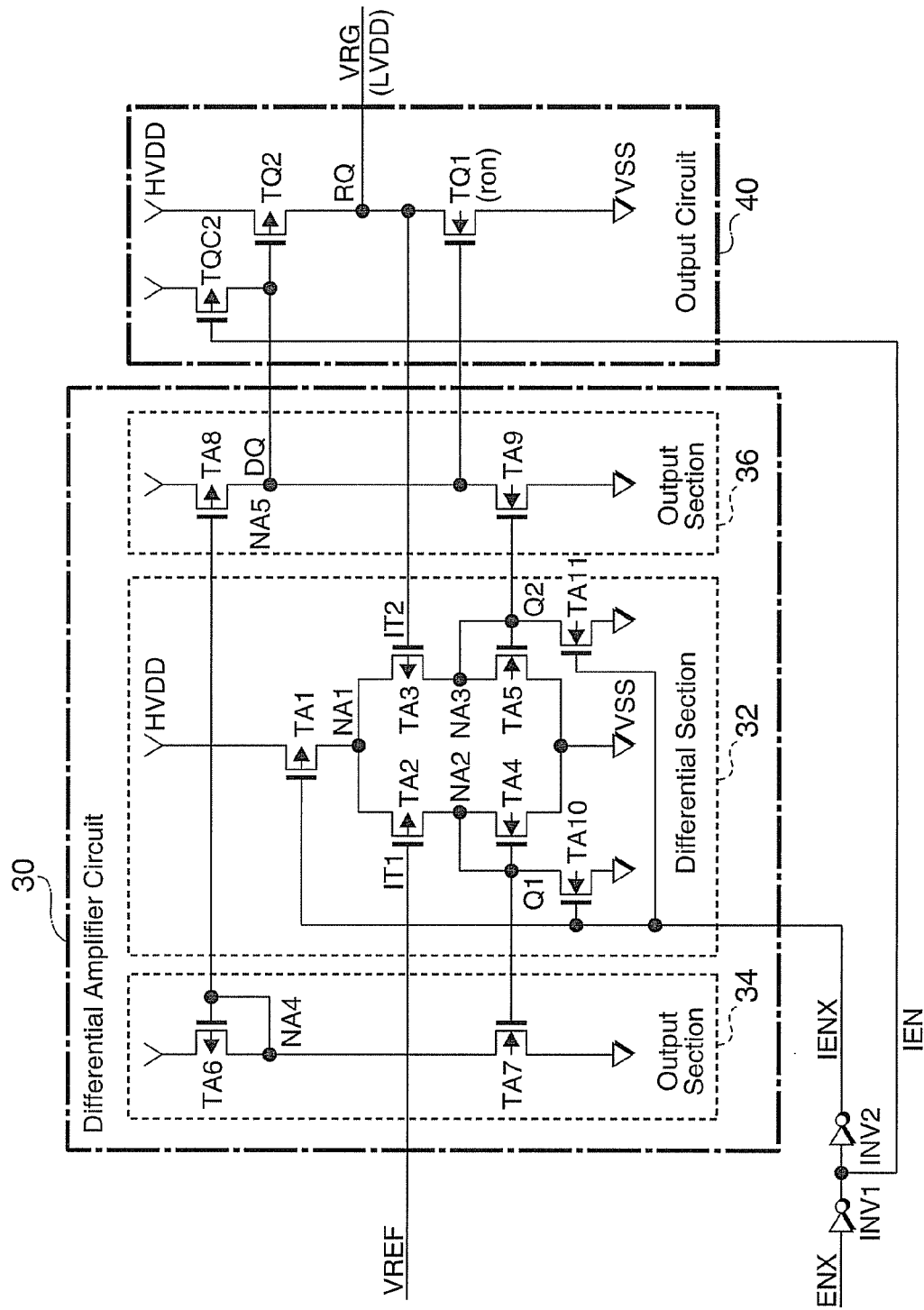
FIG. 17 is a third modified example of the regulator circuit.

FIG. 17 shows a third modified example of the regulator circuit. The regulator circuit shown in FIG. 17 does not have an output state control transistor TQC1 that is provided in the example shown in FIG. 16.

In FIG. 17, when the control signal ENX becomes H level, the output state control transistor TQC2 turns on, and the node NA5 becomes H level. Then, the output transistor TQ2 becomes an off-state, while the output transistor TQ1 becomes an on-state. By this, the state (voltage level) of the output terminal RQ of the regulator circuit can be set to L level.

When the signal ENX becomes H level, and the output terminal RQ of the regulator circuit is set to L level, the internal circuit connected to the output terminal RQ is placed in a state in which no power is supplied, whereby the internal circuit can be set to a low power consumption mode (sleep mode). Also, when the signal ENX becomes H level, the transistors TA10 and TA11 in FIG. 17 become an on-state, whereby the regulator circuit can also be set to a low power consumption mode (sleep mode). Therefore, according to the third modified example shown in FIG. 17, the regulator circuit and the internal circuit to which a power is supplied by the regulator circuit can both be set to a low power consumption mode only by controlling the signal ENX. Accordingly, the low power consumption mode can be realized with a relatively simple control.

(4) Fourth Modified Example

Figure 18:
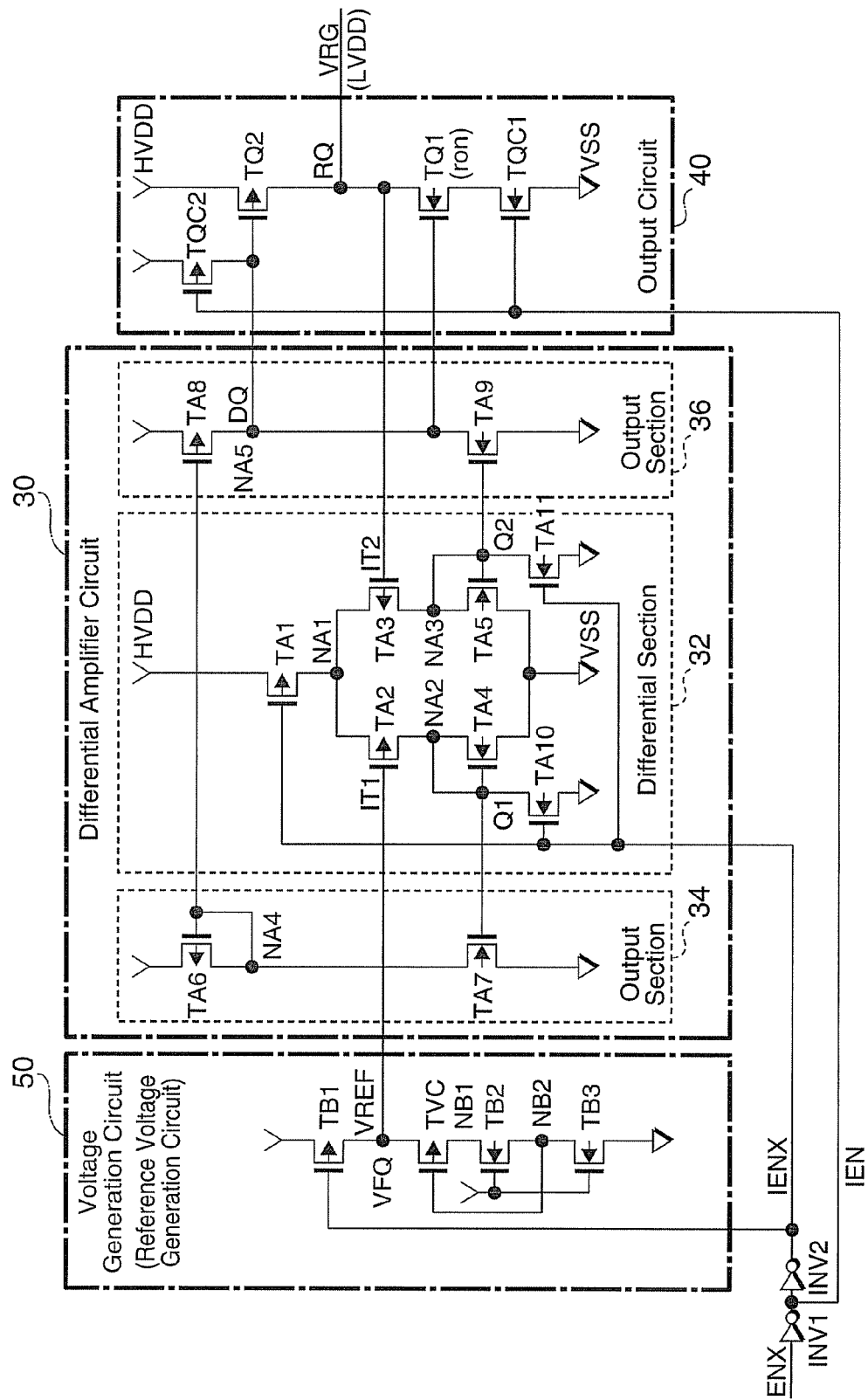
FIG. 18 is a fourth modified example of the regulator circuit.

FIG. 18 shows a fourth modified example of the regulator circuit. In the example in FIG. 18, a voltage generation circuit 50 that generates a reference voltage VREF (a reference voltage generation circuit) is added to the structure shown in FIG. 16.

Figures 19A, 19B:
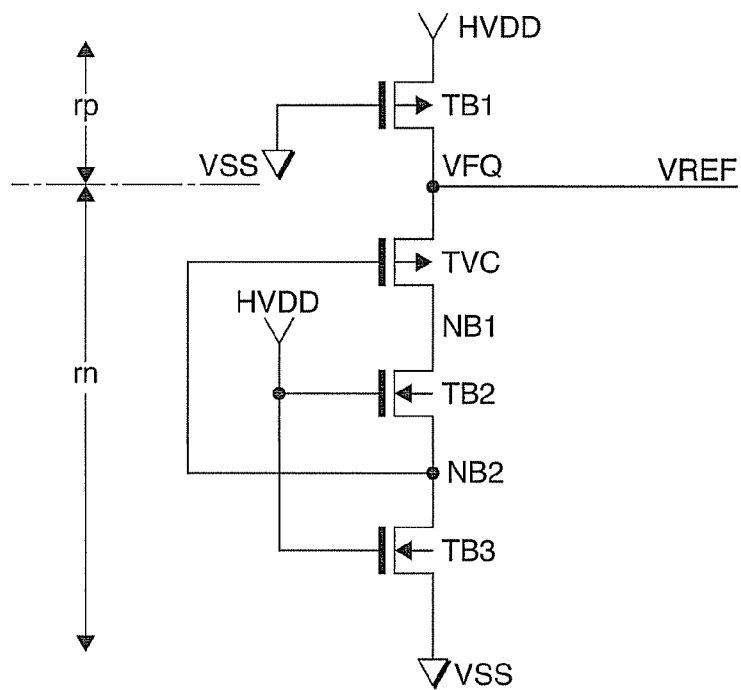
FIGS. 19A and 19B show the structure of a voltage generation circuit, and a table for describing its operations.
Figure 20:
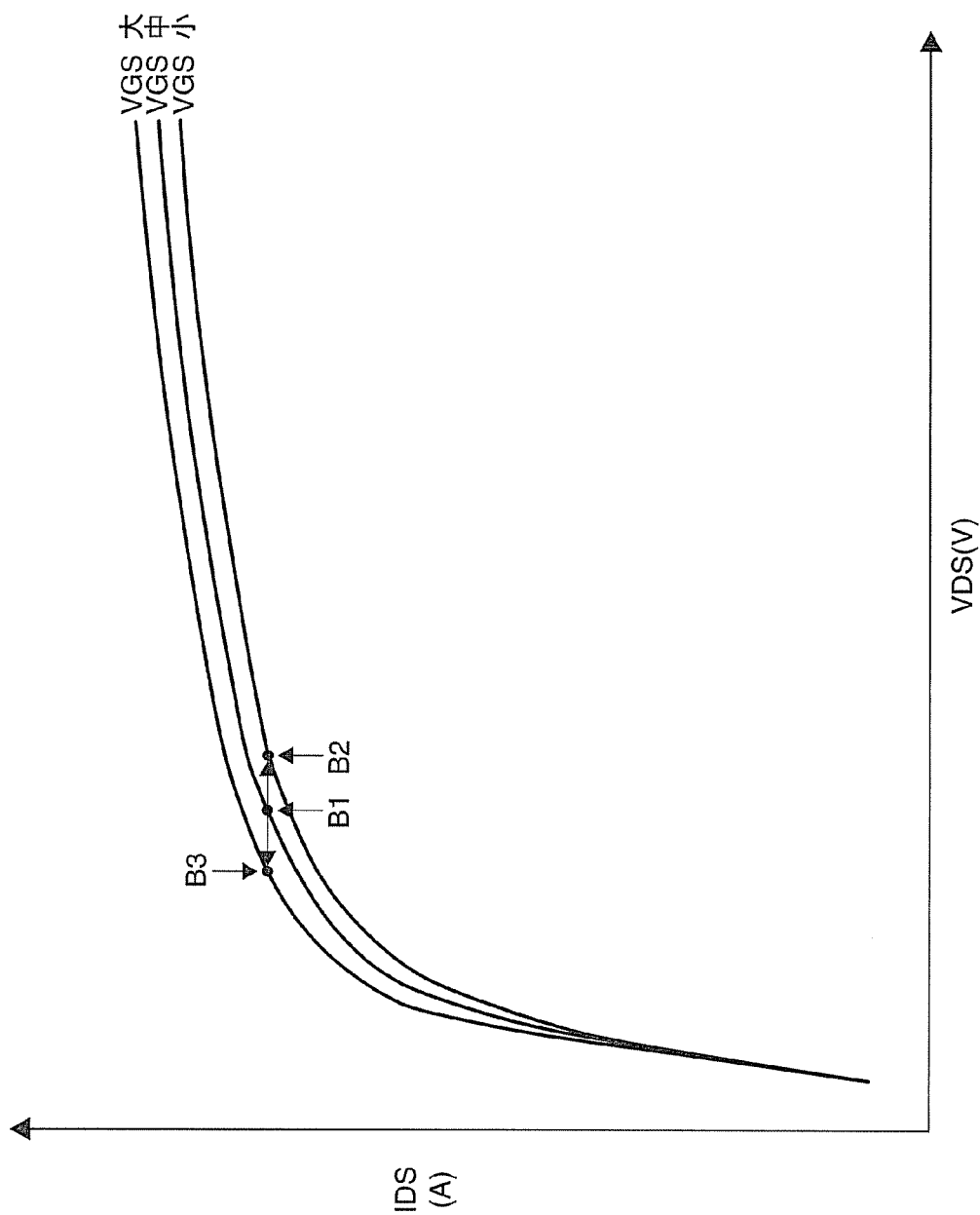
FIG. 20 is a graph for describing operation points of the voltage generation circuit.

Referring to FIGS. 19A, 19B and 20, the structure and operations of the voltage generation circuit 50 are described. The voltage generation circuit 50 is a circuit that receives inputs of power supply voltage HVDD and VSS (first and second power supplies), and outputs a reference voltage VREF (generated voltage in a broad sense) to an output terminal VFQ. The voltage generation circuit 50 includes a P-type (second conductivity type) transistor TB1 (a first resistance element in a broad sense) provided between the HVDD and the output terminal VFQ. The voltage generation circuit 50 also includes a P-type (second conductivity type) transistor TVC for voltage correction provided between the output terminal VFQ and an intermediate node NB1, and having a gate connected to an intermediate node NB2. The voltage generation circuit 50 also includes an N-type (first conductivity type) transistor TB2 (a second resistance element in a broad sense) provided between the intermediate nodes NB1 and NB2, and an N-type (first conductivity type) transistor TB3 (a third resistance element in a broad sense) provided between the intermediate node NB2 and the power supply VSS.

In this example, the transistors TB2 and TB3 are N-type transistors each having a gate to which the power supply voltage HVDD is inputted. The transistor TB1 is a P-type transistor having a gate to which the voltage of the power supply VSS is inputted. It is noted that, as shown in FIG. 18, the transistor TB1 may be a transistor whose gate voltage is controlled by a control signal ENX (IENX).

As shown in FIG. 19B, when the power supply voltage HVDD is 5.00 V, the reference voltage VREF and voltages at the nodes NB1 and NB2, are, for example, 3.30 V, 2.90 V and 1.46 V, respectively. Accordingly, the drain-to-source voltage (in absolute value) VDS of the voltage correction transistor TVC is 3.30−2.91=0.39, and the gate-to-source voltage (in absolute value) VGS is 3.30−1.46=1.84V.

As shown in FIG. 19B, when the power supply voltage HVDD lowers from 5.00 V to 4.50 V, the reference voltage VREF and the voltages at the nodes NB1 and NB2 become, for example, 3.01 V, 2.55 V, and 1.27 V, respectively. Accordingly, the drain-to-source voltage VDS of the voltage correction transistor TVC becomes 3.01−2.55=0.46 V, and the gate-to-source voltage VGS becomes 3.01−1.27=1.74 V.

For example, FIG. 20 shows VDS-IDS characteristics of the voltage correction transistor TVC. When the power supply voltage HVDD lowers from 5.00 V to 4.50 V, the operating point of the transistor TVC moves from B1 to B2. In other words, when the drain-to-source current IDS is assumed to be constant, as shown in FIG. 9B, VDS increases from 0.39 V to 0.46 V, and VGS reduces from 1.84 to 1.74 V. This means that the operating point moves from B1 to B2 in FIG. 20.

Then, when VGS of the transistor TVC reduces from 1.84 V to 1.74 V, the on-resistance value of the transistor TVC increases. Then, in FIG. 19A, the resistance value rn that is the sum of the on-resistance values of the transistors TVC, TB2 and TB3 also increases. An increase in the resistance value rn means that the reference voltage VREF that would lower due to the decrease in the power supply voltage HVDD is returned by correction to the voltage level prior to the lowering of the power supply voltage HVDD. In other words, due to the voltage correction by the transistor TVC, the voltage reduction in the reference voltage VREF becomes smaller than the voltage reduction in the power supply voltage HVDD. Accordingly, compared to the voltage change in the power supply voltage HVDD from 5.00 V to 4.50 V, the voltage change in the reference voltage VREF can be contained within a range of −10% of 3.30 V.

Also, as shown in FIG. 19B, when the power supply voltage HVDD increases from 5.00 V to 5.50 V, the reference voltage VREF and the voltages at the nodes NB1 and NB2 become, for example, 3.60 V, 3.25 V, and 1.66 V, respectively. Accordingly, the drain-to-source voltage (in absolute value) VDS of the voltage correction transistor TVC becomes 3.60−3.25=0.35 V, and the gate-to-source voltage (in absolute value) VGS becomes 3.60−1.66=1.94 V.

For example, in FIG. 20, when the power supply voltage HVDD rises from 5.00 V to 5.50 V, the operating point of the transistor TVC moves from B1 to B3. In other words, when the drain-to-source current IDS is assumed to be constant, as shown in FIG. 9B, VDS decreases from 0.39 V to 0.35 V, and VGS rises from 1.84 to 1.94 V. This means that the operating point moves from B1 to B3 in FIG. 20.

Then, when VGS of the transistor TVC elevates from 1.84 V to 1.94 V, the on-resistance value of the transistor TVC decreases. Then, in FIG. 19A, the resistance value rn that is the sum of the on-resistance values of the transistors TVC, TB2 and TB3 also decreases. A decrease in the resistance value rn means that the reference voltage VREF that would rise due to the elevation in the power supply voltage HVDD is returned by correction to the voltage level prior to the elevation of the power supply voltage HVDD. In other words, due to the voltage correction by the transistor TVC, the voltage elevation in the reference voltage VREF becomes smaller than the voltage elevation in the power supply voltage HVDD. Accordingly, compared to the voltage change in the power supply voltage HVDD from 5.00 V to 5.50 V, the voltage change in the reference voltage VREF can be contained within a range of +10% of 3.30 V. Therefore, after all, the voltage change in the reference voltage VREF can be contained within a range of ±10% of 3.3 V.

According to the example in FIG. 19A, the voltage generation circuit that can generate a reference voltage VREF with a certain accuracy level can be realized with a relatively simple structure using a smaller number of circuit elements.

Also, according to the voltage generation circuit shown in FIG. 19A, a reference voltage VREF close to the power supply voltage HVDD can be generated. For example, when the power supply HVDD is 5.0 V, a reference voltage VREF at 3.3 V can be generated. Accordingly, as shown in FIG. 18, a voltage generation circuit that forms an optimal combination with the regulator circuit in accordance with the present embodiment can be realized.

More specifically, with the regulator circuit in FIG. 18, a voltage that is the same as the reference voltage VREF is outputted as the regulation voltage VRG. Accordingly, when the reference voltage VREF is as low as 1.2-1.4 V, the regulation voltage VRG outputted from the regulator circuit also becomes as low as 1.2-1.4 V.

In contrast, in the voltage generation circuit in FIG. 19A, for example, a reference voltage VREF at 3.3 V can be generated. Accordingly, by combining the voltage generation circuit in FIG. 19A with the regulator circuit in accordance with the present embodiment, the regulation voltage VRG outputted from the regulator circuit can be set to, for example, 3.3 V, whereby a suitable regulation voltage VRG can be supplied to the internal circuit of the integrated circuit device.

In FIG. 18, the gate voltage of the transistor TB1 is controlled by the control signal ENX (IENX). In other words, the transistor TB1 goes to an on-state when the control signal ENX becomes L level, and goes to an off-state when the control signal ENX becomes H level. When the transistor TB1 becomes an off-state, the current that flows to the voltage generation circuit 50 can be shut off, whereby a low power consumption mode (sleep mode) can be realized. In other words, only by setting the control signal ENX to H level, the voltage generation circuit, the regulator circuit and the internal circuit can all be set to a low power consumption mode.

(5) Fifth Modified Example

Figure 21:
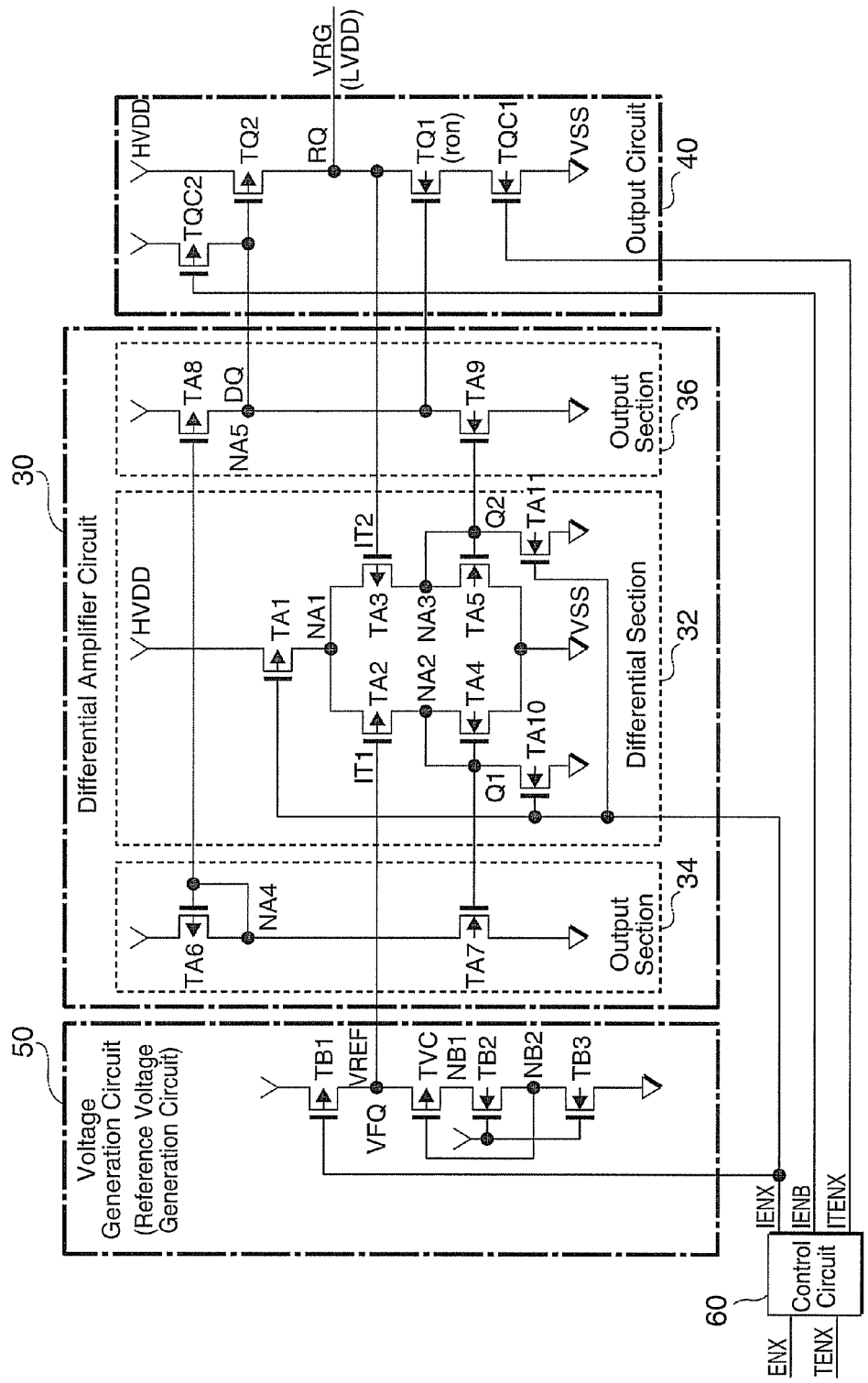
FIG. 21 is a fifth modified example of the regulator circuit.

FIG. 21 shows a fifth modified example of the regulator circuit. In the example shown in FIG. 21, a control circuit 60 that generates control signals IENX, IENB and ITENX based on control signals ENX and TENX is added to the structure shown in FIG. 18.

Figure 22:
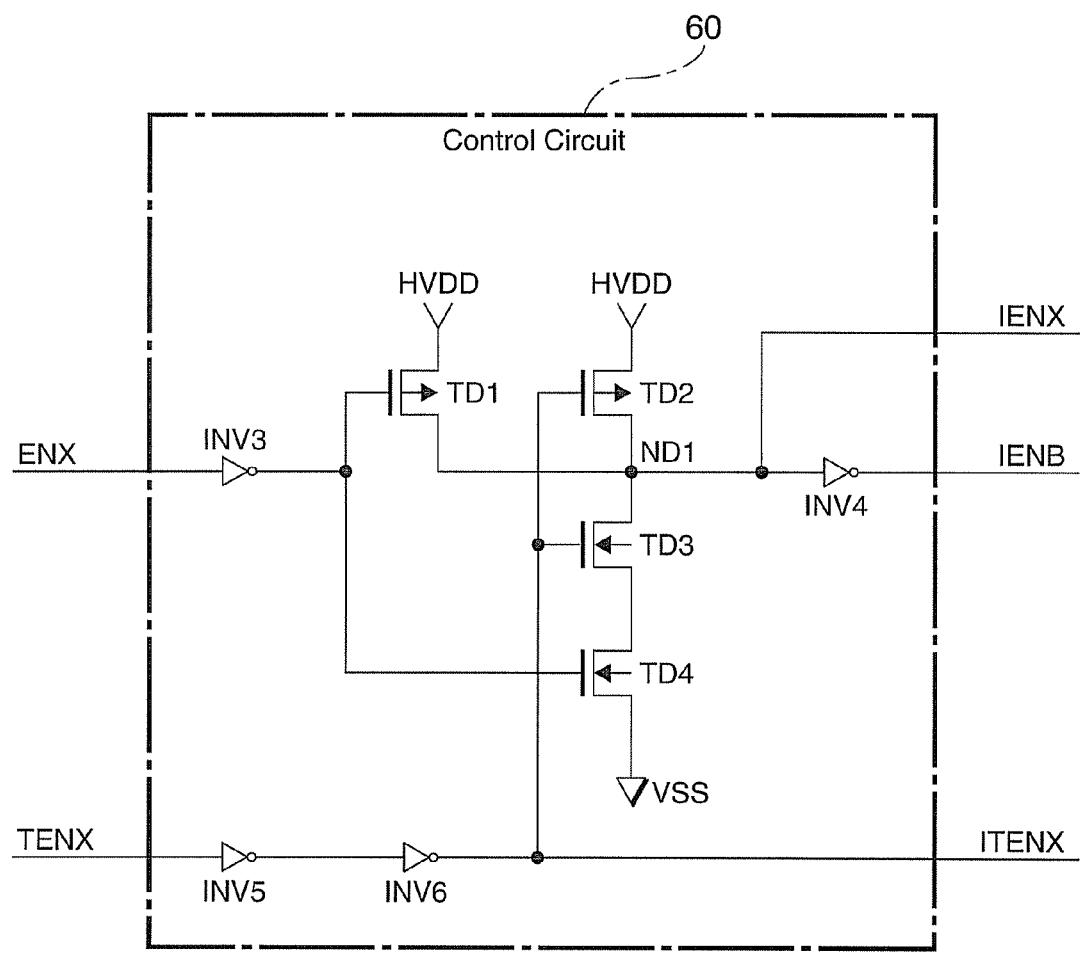
FIG. 22 shows an example of the structure of a control circuit.

Referring to FIG. 22, an example of the circuit structure of the control circuit 60 is described. The control circuit 60 includes an inverter INV3 that inverts a control signal ENX and outputs the same. Also, the control circuit 60 includes P-type transistors TD1 and TD2 provided in parallel between the power supply HVDD and a node ND1. Further, the control circuit 60 includes N-type transistors TD3 and TD4 provided in series between the node ND1 and the power supply VSS. An output of the inverter INV3 is supplied to the gates of the transistors TD1 and TD4. The potential at the node ND1 is outputted as a control signal IENX. Also, the control circuit 60 includes an inverter INV4 that inverts the potential at the node ND1, in other words, the control signal IENX and outputs the same as a control signal IENB.

Furthermore, the control circuit 60 includes an inverter INV5 that inverts a control signal TENX and outputs the same, and an inverter INV6 that inverts the output of the inverter INV5 and outputs the same as a control signal ITENX. Accordingly, when the control signal TENX is at L level, the control signal ITENX becomes L level, and when the control signal TENX is at H level, the control signal ITENX becomes H level.

The output of the inverter INV6, in other words, the control signal ITENX is supplied to the gates of the transistors TD2 and TD3. Accordingly, when the control signal TENX (ITENX) is at H level, and the control signal ENX is at L level, the control signal IENX becomes L level and the control signal IENB becomes H level. Also, when the control signal TENX (ITENX) is at L level or the control signal ENX is at H level, the control signal IENX becomes H level and the control signal IENB becomes L level.

FIG. 23A is a truth table of the control circuit 60 shown in FIG. 22. When the control signal ENX is at L level and the control signal TENX is at H level, the control signal IENX becomes L level, the control signal IENB becomes H level and the control signal ITENX becomes H level.

Further, when the control signal ENX is at H level and the control signal TENX is at H level, the control signal IENX becomes H level, the control signal IENB becomes L level and the control signal ITENX becomes H level. Moreover, when the control signal TENX is at L level, the control signal IENX becomes H level, the control signal IENB becomes L level and the control signal ITENX becomes L level. In this case, the control signal ENX may be at H level or L level (don't care condition).

Referring back to FIG. 21, the control signal IENX is supplied to the gate of the transistor TB1 in the voltage generation circuit 50, and to the gates of the transistors TA1, TA10 and TA11 in the differential amplifier circuit 30. Also, the control signal IENB is supplied to the gate of the transistor TQC2 in the output circuit 40. Furthermore, the control signal ITENX is supplied to the gate of the transistor TQC1 in the output circuit 40.

FIG. 23B is a truth table of the regulator circuit shown in FIG. 21. When the control signal ENX becomes L level and the control signal TENX becomes H level whereby the control signal IENX becomes L level, the control signal IENB becomes H level, and the control signal ITENX becomes H level, the transistor TB1 in the voltage generation circuit 50 and the transistor TA1 in the differential amplifier circuit 30 become an on-state, the transistor TQC2 in the output circuit 40 becomes an off-state, and the transistor TQC1 in the output circuit 40 becomes an on-state. Accordingly, the state of the output terminal RQ becomes LVDD.

Also, when the control signal ENX becomes H level and the control signal TENX becomes H level, whereby the control signal IENX becomes H level, the control signal IENB becomes L level, and the control signal ITENX becomes H level, the transistor TB1 in the voltage generation circuit 50 and the transistor TA1 in the differential amplifier circuit 30 become an off-state, and the current flowing to the voltage generation circuit 50 and the differential amplifier circuit 30 is shut off. Further, the transistor TQC2 in the output circuit 40 becomes an on-state, and the transistor TQC1 in the output circuit 40 becomes an on-state. Accordingly, the state of the output terminal RQ becomes VSS.

Further, when the control signal TENX becomes L level whereby the control signal IENX becomes H level, the control signal IENB becomes L level and the control signal ITENX becomes L level, the transistor TB1 in the voltage generation circuit 50 and the transistor TA1 in the differential amplifier circuit 30 become an off-state, and the current flowing to the voltage generation circuit 50 and the differential amplifier circuit 30 is shut off. Also, the transistor TQC2 in the output circuit 40 becomes an on-state, and the transistor TQC1 in the output circuit 40 becomes an off-state. Accordingly, the state of the output terminal RQ becomes a high impedance state.

When the integrated circuit device is set to a test mode to test the internal circuit, it is not desirous to supply the voltage of the feed power LVDD generated by the regulator circuit to the internal circuit. Therefore, in such a test mode, the control signal TENX is set to L level, whereby the output terminal RQ of the regulator circuit is set to a high-impedance state. Then a feed power LVDD from a tester (a power supply section) is directly supplied to the internal circuit through a pad (see FIG. 2B). By so doing, the internal circuit can be tested without being influenced by a voltage error in the feed power LVDD generated by the regulator circuit, and therefore the reliability of the test can be increased.

Also, when the control signal TENX is set to H level and the control signal ENX is set to L level, the regulator circuit goes into a normal operation mode, and the feed power voltage LVDD is supplied to the internal circuit.

Furthermore, by setting the control signal TENX to H level, and the control signal ENX to H level, the state (voltage level) of the output terminal RQ of the regulator circuit can be set to L level (VSS). When the output terminal RQ of the regulator circuit is set to L level, no current flows to the internal circuit connected to the output terminal RQ, whereby the internal circuit can be set to a low power consumption mode (sleep mode). Also, the transistors TA10 and TA11 in FIG. 21 become an on-state, the regulator circuit can also be set to a lower power consumption mode (sleep mode). Accordingly, the regulator circuit and the internal circuit to which a power is supplied by the regulator circuit can both be set to a low power consumption mode. Accordingly, the low power consumption mode can be realized with a relatively simple control.

It is noted that the control signal ENX and the control signal TENX may be supplied from outside of the integrated circuit device through pads (see FIG. 3), or may be generated inside the integrated circuit device (see FIGS. 4-6).

(6) Sixth Modified Example

Figure 24:
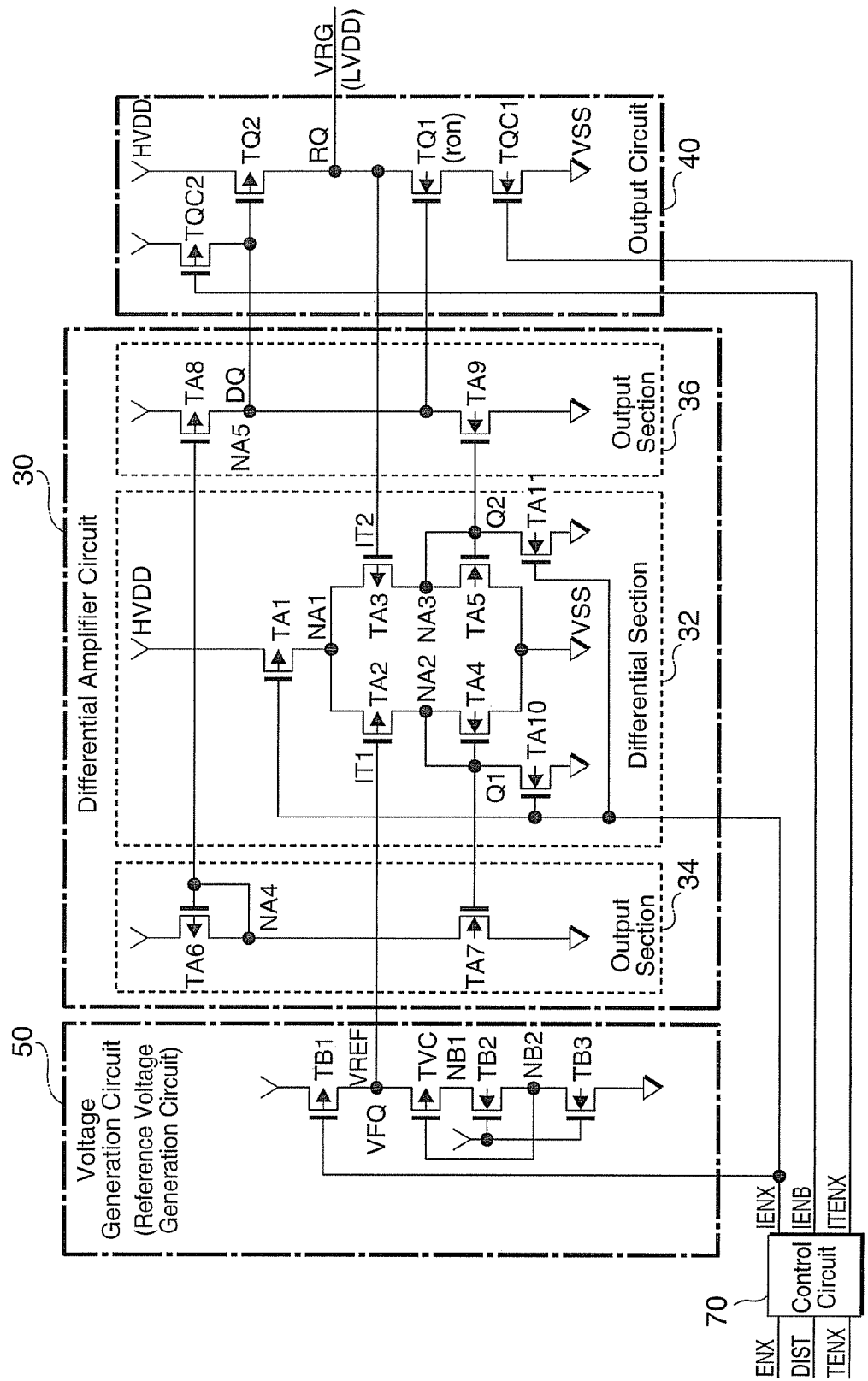
FIG. 24 is a sixth modified example of the regulator circuit.

FIG. 24 shows a sixth modified example of the regulator circuit. In the example shown in FIG. 24, a control circuit 70 that generates control signals IENX, IENB and ITENX based on control signals ENX, DIST and TENX is added to the structure shown in FIG. 18.

FIG. 25A is a truth table of the control circuit 70 shown in FIG. 24. As indicated in FIG. 25A, when the control signal ENX is at L level and the control signal TENX is at H level, the control signal IENX becomes L level, the control signal IENB becomes H level, and the control signal ITENX becomes H level. In this case, the control signal DIST may either be H level or L level (don't care condition).

Also, when the control signal ENX is at H level, the control signal DIST is at L level and the control signal TENX is at H level, the control signal IENX becomes H level, the control signal IENB becomes L level and the control signal ITENX becomes H level. Furthermore, when the control signal ENX is at H level, the control signal DIST is at H level and the control signal TENX is at H level, the control signal IENX becomes H level, the control signal IENB becomes L level, and the control signal ITENX becomes L level.

Also, when the control signal TENX is at L level, the control signal IENX becomes H level, the control signal IENB becomes L level, and the control signal ITENX becomes L level. In this case, the control signals ENX and DIST may be either at H level or L level (don't care condition).

Referring back to FIG. 24, the control signal IENX is supplied to the gate of the transistor TB1 in the voltage generation circuit 50 and to the gates of the transistors TA1, TA10 and TA11 in the differential amplifier circuit 30. Also, the control signal IENB is supplied to the gate of the transistor TQC2 in the output circuit 40. Further, the control signal ITENX is supplied to the gate of the transistor TQC1 in the output circuit 40.

FIG. 25B is a truth table of the regulator circuit shown in FIG. 24. When the control signal ENX becomes L level and the control signal TENX becomes H level whereby the control signal IENX becomes L level, the control signal IENB becomes H level, and the control signal ITENX becomes H level, the transistor TB1 in the voltage generation circuit 50 and the transistor TA1 in the differential amplifier circuit 30 become an on-state, the transistor TQC2 in the output circuit 40 becomes an off-state, and the transistor TQC1 in the output circuit 40 becomes an on-state. Accordingly, the state of the output terminal RQ becomes LVDD.

Also, when the control signal ENX becomes H level, the control signal DIST becomes L level and the control signal TENX becomes H level, whereby the control signal IENX becomes H level, the control signal IENB becomes L level, and the control signal ITENX becomes H level, the transistor TB1 in the voltage generation circuit 50 and the transistor TA1 in the differential amplifier circuit 30 become an off-state, and the current flowing to the voltage generation circuit 50 and the differential amplifier circuit 30 is shut off. Further, the transistor TQC2 in the output circuit 40 becomes an on-state, and the transistor TQC1 in the output circuit 40 becomes an on-state. Accordingly, the state of the output terminal RQ becomes VSS.

Further, when the control signal ENX becomes H level, the control signal DIST becomes H level and the control signal TENX becomes H level whereby the control signal IENX becomes H level, the control signal IENB becomes L level and the control signal ITENX becomes L level, the transistor TB1 in the voltage generation circuit 50 and the transistor TA1 in the differential amplifier circuit 30 become an off-state, and the current flowing to the voltage generation circuit 50 and the differential amplifier circuit 30 is shut off. Also, the transistor TQC2 in the output circuit 40 becomes an on-state, and the transistor TQC1 in the output circuit 40 becomes an off-state. Accordingly, the state of the output terminal RQ becomes a high impedance state.

Further, when the control signal TENX becomes L level whereby the control signal IENX becomes H level, the control signal IENB becomes L level and the control signal ITENX becomes L level, the transistor TB1 in the voltage generation circuit 50 and the transistor TA1 in the differential amplifier circuit 30 become an off-state, and the current flowing to the voltage generation circuit 50 and the differential amplifier circuit 30 is shut off. Also, the transistor TQC2 in the output circuit 40 becomes an on-state, and the transistor TQC1 in the output circuit 40 becomes an off-state. Accordingly, the state of the output terminal RQ becomes a high-impedance state.

When the integrated circuit device is set to a test mode to test the internal circuit, it is not desirous to supply the voltage of the feed power LVDD generated by the regulator circuit to the internal circuit. Therefore, in such a test mode, the control signal TENX is set to L level, whereby the output terminal RQ of the regulator circuit is set to a high-impedance state. Then a feed power LVDD from the tester (a power supply section) is directly supplied to the internal circuit through a pad (see FIG. 2B). By so doing, the internal circuit can be tested without being influenced by a voltage error in the feed power LVDD generated by the regulator circuit, and therefore the reliability of the test can be increased.

Also, when the control signal TENX is set to H level and the control signal ENX is set to L level, the regulator circuit goes into a normal operation mode, and the feed power voltage LVDD is supplied to the internal circuit.

Furthermore, by setting the control signal TENX to H level, the control signal ENX to H level and the control signal DIST to L level, the state (voltage level) of the output terminal RQ of the regulator circuit can be set to L level (VSS). When the output terminal RQ of the regulator circuit is set to L level, no power is supplied to the internal circuit connected to the output terminal RQ, whereby the internal circuit can be set to a low power consumption mode (sleep mode). Also, the transistors TA10 and TA11 in FIG. 24 become an on-state, the regulator circuit can also be set to a lower power consumption mode (sleep mode). Accordingly, the regulator circuit and the internal circuit to which a power is supplied by the regulator circuit can both be set to a low power consumption mode. By this, the low power consumption mode can be realized with a relatively simple control.

Furthermore, when the control signal TENX is set to H level, the control signal ENX to H level and the control signal DIST to H level, the state of the output terminal RQ of the regulator circuit becomes a high-impedance state.

For example, when an integrated circuit device in accordance with the present embodiment is applied to a custom product, there may be an occasion where the customer of the custom product wants the feed power LVDD not to be generated by the regulator circuit, but to be supplied from the external power supply source. Concretely, for example, let us consider a case in which the regulator circuit has a circuit specification to step down the power supply voltage HVDD at 5V to a feed power voltage LVDD (VRG) at 3.3V. In some cases, the customer of the custom product wants the internal circuit to be operated at 2.5V, instead of 3.3V, in order to reduce the power consumption. In this case, the customer may set the control signals ENX and DIST to H level, such that the output terminal RQ of the regulator circuit can be set to a high impedance state. As a result, the feed power LVDD from the external power supply section can be directly supplied through a pad to the internal circuit, such that a wide range of requests by the customers can be accommodated.

It is noted that the control signals ENX, DIST and TENX may be supplied from outside of the integrated circuit device through pads (see FIG. 3), but may be generated inside the integrated circuit device (see FIGS. 4-6).

The embodiments of the invention are described above in detail. However, those skilled in the art should readily understand that many modifications can be made without departing in substance from the novel matter and effects of the invention. Accordingly, those modified examples are also included in the scope of the invention. For example, the terms (VSS, HVDD, N-type, P-type, reference voltage and the like) that are described at least once in association with different terms in broader sense or in equivalent terms in the specification or drawings can be replaced with these different terms anywhere in the specification and drawings. Furthermore, the structure and operations of the integrated circuit device and the regulator circuit are not limited to the embodiments described above, and various modifications can be implemented. Also the structure of the regulator circuit disposed in the integrated circuit device is not limited to the circuits with the structures described in the embodiments. Also, structures formed by combining the modified examples described in the embodiments can be included in the scope of the invention.

What is claimed is:

1. An integrated circuit device comprising:
an internal circuit disposed on an inside area of the integrated circuit device; and
at least one regulator circuit that generates a regulation voltage formed by stepping down a rower supply voltage provided from outside, wherein:
an output terminal of the regulator circuit is connected to a first pad that is an external terminal of the integrated circuit device and a power supply line of the internal circuit,
the regulator circuit controls the state of the output terminal based on a plurality of control signals inputted respectively to a plurality of control terminals,
the regulator circuit includes a differential amplifier circuit having a first input terminal that receives as an input a reference voltage and a second input terminal that receives as an input the regulation voltage of the regulator circuit, and amplifies a voltage difference between the reference voltage and the regulation voltage, and an output circuit that is connected to an output terminal of the differential amplifier circuit and outputs the regulation voltage,
the output circuit includes a first conductivity type first output transistor provided between the output terminal of the regulator circuit and a first power supply and having a gate connected to the output terminal of the differential amplifier circuit, and a second conductivity type second output transistor provided between a second power supply and the output terminal of the regulator circuit and having a gate connected to the output terminal of the differential amplifier circuit,
the differential amplifier circuit includes a differential section having the first and second input terminals, a first output section connected to a first output terminal of the differential section, and a second output section connected to a second output terminal of the differential section,
the differential section includes a second conductivity type first transistor for generating bias current provided between the second power supply and a first node, a second conductivity type second transistor provided between the first node and a second node and having a gate that serves as the first input terminal, a second conductivity type third transistor provided between the first node and a third node and having a gate that serves as the second input terminal, a first conductivity type fourth transistor provided between the second node and the first power supply and having a gate connected to the second node, and a first conductivity type fifth transistor provided between the third node and the first power supply and having a gate and a drain connected to the third node,
the first output section includes a second conductivity type sixth transistor provided between the second power supply and a fourth node and having a gate connected to the fourth node, and a first conductivity type seventh transistor provided between the fourth node and the first power supply and having a gate connected to the second node, and
the second output section includes a second conductivity type eighth transistor provided between the second power supply and a fifth node and having a gate connected to the fourth node, and a first conductivity type ninth transistor provided between the fifth node and the first power supply and having a gate connected to the third node.

2. An integrated circuit device according to claim 1, wherein the state of the output terminal of the regulator circuit is set to a high impedance state when a first control signal among the plurality of control signals is activated.

3. An integrated circuit device according to claim 2, wherein the state of the output terminal of the regulator circuit is set to a state based on a second control signal among the plurality of control signals, when the first control signal among the plurality of control signals is deactivated.

4. An integrated circuit device according to claim 3, wherein the state of the output terminal of the regulator circuit is set to a state based on a third control signal among the plurality of control signals, when the first and second control signals among the plurality of control signals are deactivated.

5. An integrated circuit device according to claim 1, wherein, when the regulation voltage is directly supplied from outside of the integrated circuit device to the internal circuit through the first pad, the state of the output terminal of the regulator circuit is set to a high-impedance state.

6. An integrated circuit device according to claim 1, wherein, when the integrated circuit device is set to a test mode, the state of the output terminal of the regulator circuit is set to a high impedance state.

7. An integrated circuit device according to claim 1, wherein a capacitor for stabilizing the regulation voltage of the regulator circuit is connected to the first pad.

8. An integrated circuit device according to claim 1, wherein the regulator circuit controls the state of the output terminal based on the plurality of control signals inputted respectively to the plurality of control terminals through a plurality of pads that are external terminals of the integrated circuit device.

9. An integrated circuit device according to claim 1, wherein the regulator circuit control the state of the output terminal based on the plurality of control signals inputted respectively to the plurality of control terminals from a control circuit that operates with a power supply other than the power supply of the regulation voltage.

10. An integrated circuit device according to claim 1, wherein
the regulator circuit includes an internal control circuit that generates a first internal control signal based on the plurality of control signals, and
the differential section includes a first conductivity type tenth transistor that is provided between the second node and the first power supply and turns on and off based on the first internal control signal, and a first conductivity type eleventh transistor that is provided between the third node and the first power supply and turns on and off based on the first internal control signal.

11. An integrated circuit device comprising:
an internal circuit disposed on an inside area of the integrated circuit device; and
at least one regulator circuit that generates a regulation voltage formed by stepping down a power supply voltage provided from outside, wherein;
an output terminal of the regulator circuit is connected to a first pad that is an external terminal of the integrated circuit device and a power supply line of the internal circuit,
the regulator circuit controls the state of the output terminal based on a plurality of control signals inputted respectively to a plurality of control terminals,
the regulator circuit includes a differential amplifier circuit having a first input terminal that receives as an input a reference voltage and a second input terminal that receives as an input the regulation voltage of the regulator circuit, and amplifies a voltage difference between the reference voltage and the regulation voltage, and an output circuit that is connected to an output terminal of the differential amplifier circuit and outputs the regulation voltage,
the output circuit includes a first conductivity type first output transistor provided between the output terminal of the regulator circuit and a first power supply and having a gate connected to the output terminal of the differential amplifier circuit, and a second conductivity type second output transistor provided between a second power supply and the output terminal of the regulator circuit and having a gate connected to the output terminal of the differential amplifier circuit,
the regulator circuit includes an internal control circuit that generates a second internal control signal based on the plurality of control signals, and
the output circuit includes a first conductivity type first output state control transistor that is provided between the first output transistor and the first power supply and turns on and off based on the second internal control signal.

12. An integrated circuit device comprising:
an internal circuit disposed on an inside area of the integrated circuit device; and
at least one regulator circuit that generates a regulation voltage formed by stepping down a power supply voltage provided from outside, wherein:
an output terminal of the regulator circuit is connected to a first pad that is an external terminal of the integrated circuit device and a power supply line of the internal circuit,
the regulator circuit controls the state of the output terminal based on a plurality of control signals inputted respectively to a plurality of control terminals,
the regulator circuit includes a differential amplifier circuit having a first input terminal that receives as an input a reference voltage and a second input terminal that receives as an input the regulation voltage of the regulator circuit, and amplifies a voltage difference between the reference voltage and the regulation voltage, and an output circuit that is connected to an output terminal of the differential amplifier circuit and outputs the regulation voltage,
the output circuit includes a first conductivity type first output transistor provided between the output terminal of the regulator circuit and a first power supply and having a gate connected to the output terminal of the differential amplifier circuit, and a second conductivity type second output transistor provided between a second power supply and the output terminal of the regulator circuit and having a gate connected to the output terminal of the differential amplifier circuit, and
the regulator circuit includes an internal control circuit that generates a third internal control signal based on the plurality of control signals, and the output circuit includes a second conductivity type second output state control transistor that is provided between the second power supply and the output terminal of the differential amplifier circuit and turns on and off based on the third internal control signal.

* * * * *